(12) United States Patent
Takagi et al.

(10) Patent No.: US 8,780,447 B2
(45) Date of Patent: Jul. 15, 2014

(54) VIRTUAL IMAGE DISPLAY DEVICE AND METHOD OF MANUFACTURING THE SAME

(75) Inventors: Masayuki Takagi, Shiojiri (JP); Takahiro Totani, Suwa (JP); Toshiaki Miyao, Matsumoto (JP); Akira Komatsu, Kamiina-gun (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/601,528

(22) Filed: Aug. 31, 2012

(65) Prior Publication Data
US 2013/0083403 A1    Apr. 4, 2013

(30) Foreign Application Priority Data
Oct. 3, 2011    (JP) ................................. 2011-218976

(51) Int. Cl.
*G02B 27/14*    (2006.01)
*G02B 27/01*    (2006.01)

(52) U.S. Cl.
CPC .................................. *G02B 27/0172* (2013.01)
USPC .............................. 359/633; 359/630; 345/8

(58) Field of Classification Search
USPC .................. 345/7–9, 102, 103; 359/630–634; 349/11, 15
See application file for complete search history.

(56) References Cited

U.S. PATENT DOCUMENTS

| 2003/0165017 | A1 | 9/2003 | Amitai |
| 2004/0085649 | A1 | 5/2004 | Repetto et al. |
| 2007/0041703 | A1* | 2/2007 | Wang ............................ 385/147 |
| 2010/0103078 | A1* | 4/2010 | Mukawa et al. .................. 345/8 |

FOREIGN PATENT DOCUMENTS

| JP | A-2003-536102 | 12/2003 |
| JP | A-2004-157520 | 6/2004 |

* cited by examiner

*Primary Examiner* — Darryl J Collins
*Assistant Examiner* — Gary O'Neill
(74) *Attorney, Agent, or Firm* — Oliff PLC

(57) ABSTRACT

In a virtual image display device, a mirror layer has a thickness of 50 nm or more to perform non-transparent reflection in a second ridge line vicinity area on a third reflection face side in a ridge line portion extending between the third reflection face and a second reflection face. Accordingly, reflectance of image light can be prevented from being decreased by the second ridge line vicinity area (that is, a peripheral portion on a light guide unit in the third reflection face), and thus stripe-shaped brightness unevenness extending in a longitudinal direction can be prevented from occurring on the viewed image. That is, in the image display device, it is possible to secure sufficient reflection even in the peripheral portion close to a boundary with the second reflection face with respect to the third reflection face, and also to display a bright image with little brightness unevenness.

15 Claims, 15 Drawing Sheets

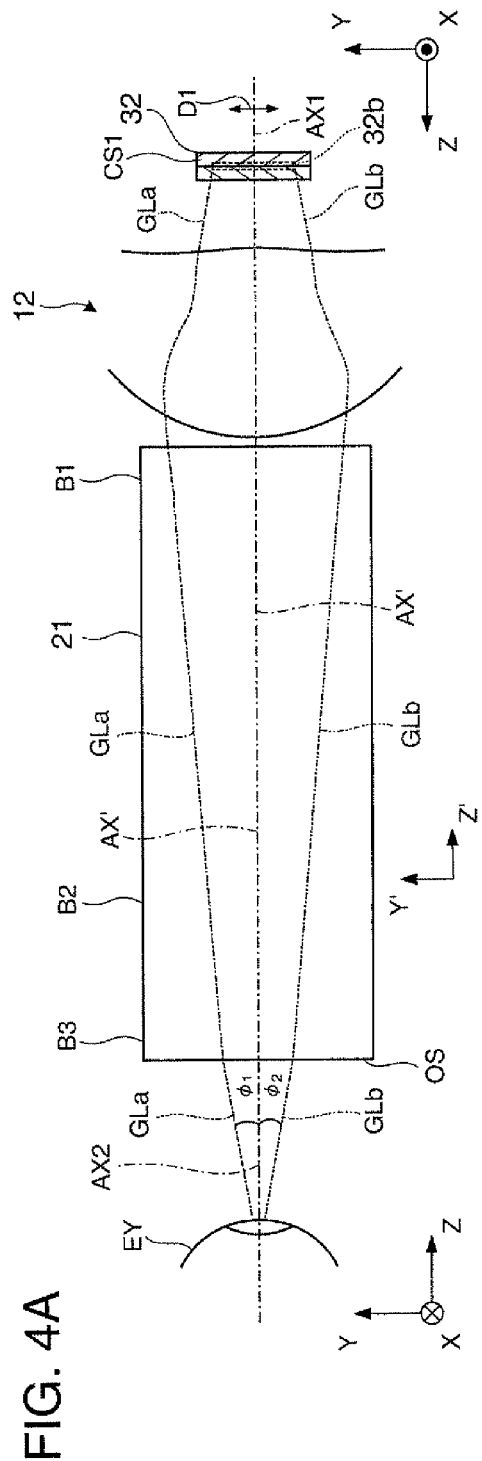
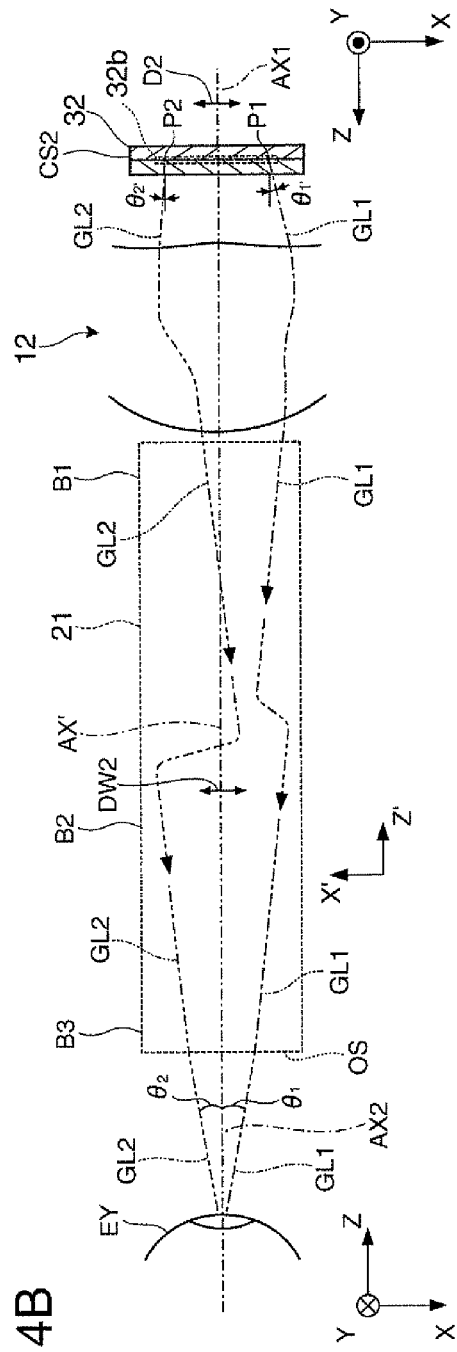
FIG. 4A
FIG. 4B

FIG. 9A
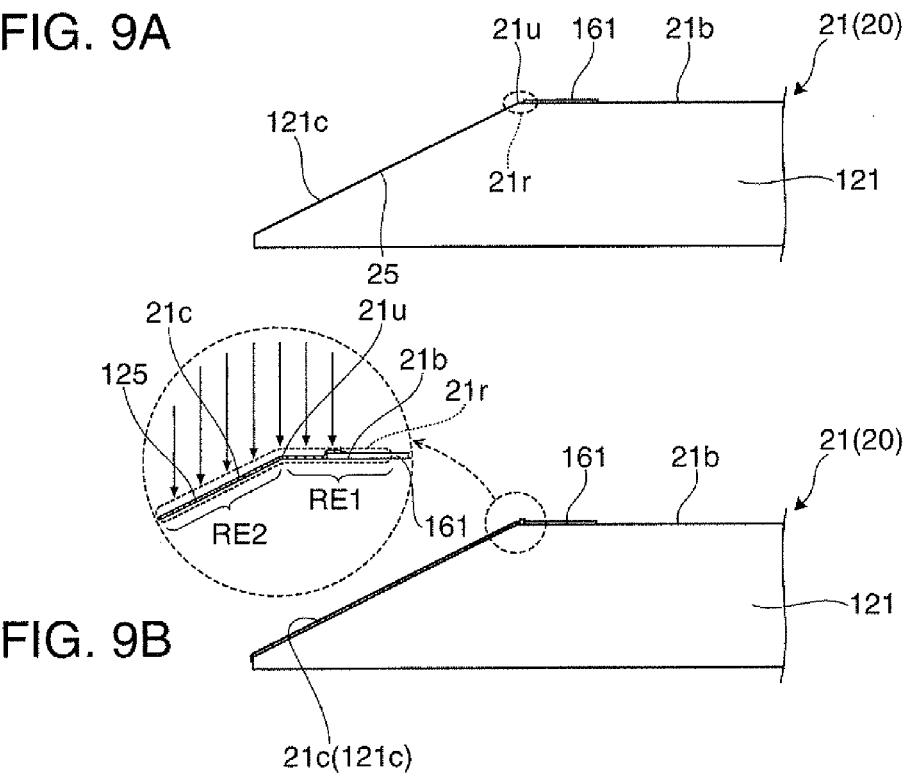
FIG. 9C
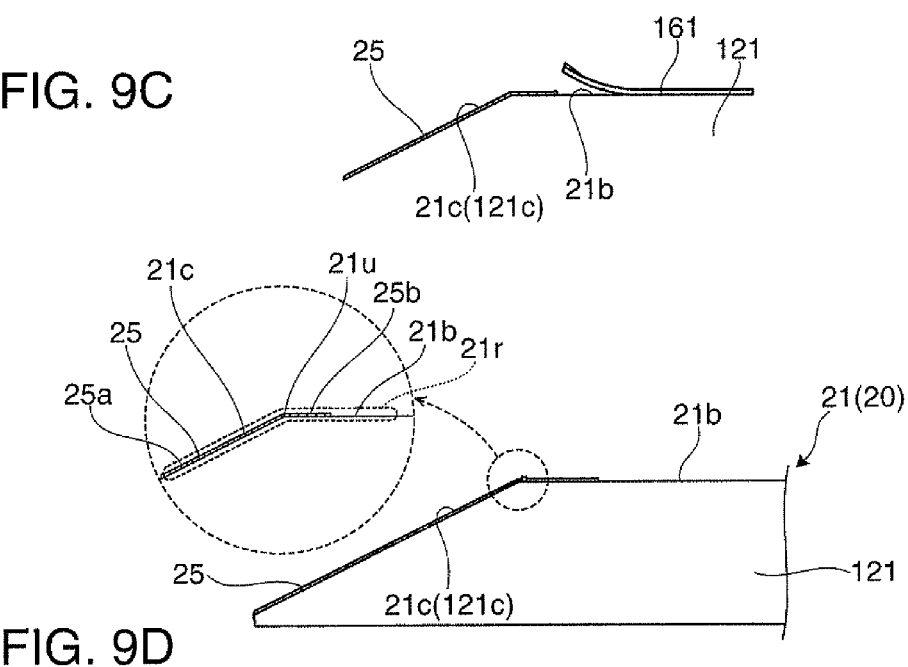
FIG. 9D

VIRTUAL IMAGE DISPLAY DEVICE AND METHOD OF MANUFACTURING THE SAME

BACKGROUND

1. Technical Field

The present invention relates to a virtual image display device such as a head mount display mounted and used on a head and a method of manufacturing the same.

2. Related Art

Recently, as a virtual image display device which enables a virtual image to be formed and viewed such as a head mount display, various types of devices which guide image light from a display element to eyes of a viewer by a light guide plate have been proposed. As the light guide plate for such a virtual image display device, a light guide plate is known which directs image light using total reflection, reflects the image light on a plurality of partial reflection faces disposed in parallel to each other at a predetermined angle with respect to a main face of the light guide plate, and emits the image light from the light guide plate, such that the image light reaches retinas of the viewer (see JP-T-2003-536102, and JP-A-2004-157520).

In the virtual image display device described above, stripe-shaped or band-shaped brightness unevenness extending in a longitudinal direction tends to occur. A light flux from across section of the display element is received on the light incident side of the light guide plate according to a side position thereof and an angle direction used in display is significantly changed, and a plurality of modes of image light with different numbers of times of reflection in the light guide plate are synthesized to be connected to each other in the transverse direction on the light emission side of the light guide plate. In this case, the brightness tends to decrease at a part corresponding to a connection point, particularly, it is thought that the brightness is decreased by light extinction in an opening periphery of a folded mirror provided on the light incident side, and the stripe-shaped brightness unevenness extending in the longitudinal direction occurs.

SUMMARY

An advantage of some aspects of the invention is to provide a virtual image display device suppressing occurrence of brightness unevenness, and a method of manufacturing the same.

An aspect of the invention is directed to a virtual image display device including: (a) an image display device that forms image light; (b) an optical projection system that forms a virtual image by the image light emitted from the image display device; and (c) a light guide device that has a light incident unit receiving the image light passing through the optical projection system, a light guide unit directing the image light received from the light incident unit by total reflection on first and second faces opposed to each other and extending in parallel, and a light emission unit emitting the image light passing through the light guide unit to the outside, wherein (d) the light incident unit has a third face that reflects the image light by a reflection unit forming an obtuse angle with respect to the second face, and wherein (e) the reflection unit covers a ridge line vicinity area on a third face side in an angled portion between a base face of a third face and the second face.

In the virtual image display device, since the reflection unit covers the ridge line vicinity area on the third face side in the angled portion between the base face of the third face and the second face, it is possible to prevent the reflectance of the image light from being decreased in the ridge line vicinity area (that is, the peripheral portion on the light guide unit side in the third face) on the third face side in the angled portion, and thus it is possible to prevent the stripe-shaped brightness unevenness extending, for example, in the longitudinal direction from occurring on the viewed image. That is, in the virtual image display device, it is possible to secure sufficient reflection even in the peripheral portion close to the boundary with the adjacent face on the second face side in the third face, and thus it is possible to display a bright image with little brightness unevenness.

According to a specific aspect of the invention, in the virtual image display device, the reflection unit covering the ridge line vicinity area on the third face side has a predetermined thickness or more to perform non-transparent reflection. Herein, the non-transparent reflection means a state where light quantity loss by transmission is not substantially present (for example, transmittance is equal to or less than 0.1%). In this case, it is possible to reliably prevent light leakage from occurring particularly on the third face side in the ridge line vicinity area on the third face side.

According to another specific aspect of the invention, in the virtual image display device, the reflection unit protrudes at least at a part of the ridge line vicinity area on the second face side in the angled portion. In this case, by film formation extending or overhanging up to the ridge line vicinity area (the first ridge line vicinity area) on the second face side in the angled portion, it is possible to reliably form the reflection unit having sufficient thickness even in the ridge line vicinity area (the second ridge line vicinity area) on the third face side in the angled portion.

According to still another specific aspect of the invention, in the virtual image display device, a protrusion width of the reflection unit in the ridge line vicinity area on the second face side in the angled portion is equal to or less than 0.1 mm. In this case, the amount of protrusion to the second face side of the reflection unit is suppressed, and it is possible to prevent total reflection efficiency of the image light on the second face from being relatively decreased.

According to yet another specific aspect of the invention, in the virtual image display device, transmittance of the reflection unit is equal to or less than 1% in the ridge line vicinity area on the third face side or from the ridge line vicinity area on the third face side to a part corresponding to the protrusion width on the second face side. In this case, it is possible to raise the reflectance and to suppress a decrease of light use efficiency.

According to still yet another specific aspect of the invention, in the virtual image display device, the light guide device integrally has the light incident unit, the light guide unit, and the light emission unit, as a block-shaped member, and the light emission unit has a fourth face that is adjacent to any one of the first face and the second face and forms an obtuse angle with respect to any one of the first face and the second face. In this case, the image light reflected by the third face of the light incident unit is totally reflected on the first and second faces of the light guide unit, propagates, is reflected on the fourth face of the light emission unit, and is input to the eyes of the viewer as a virtual image. The light incident unit, the light guide unit, and the light emission unit are integrally formed as the block-shaped member, and thus it is possible to form the light guide device with high precision using an injection molding technique.

According to further another specific aspect of the invention, in the virtual image display device, the reflection unit is formed of aluminum. It is easy to form the aluminum film, the aluminum has relatively high reflectance, and it is possible to raise image quality with a low cost.

Another aspect of the invention is directed to a method of manufacturing a virtual image display device including an image display device that forms image light, an optical projection system that forms a virtual image by the image light emitted from the image display device, and a light guide device that has alight incident unit receiving the image light passing through the optical projection system, a light guide unit directing the image light received from the light incident unit by total reflection on first and second faces opposed to each other and extending in parallel, and a light emission unit emitting the image light passing through the light guide unit to the outside, wherein the light incident unit forms an obtuse angle with respect to the second face, and has a third face that reflects the image light by an attendant reflection unit, and wherein the reflection unit is formed in the ridge line vicinity area on the third face side in an angled portion between a base face of the third face and the second face.

In the method of manufacturing a virtual image display device, since the reflection unit covers the ridge line vicinity area on the third face side in the angled portion between the base face of the third face and the second face, it is possible to prevent the reflectance of the image light from being decreased in the ridge line vicinity area on the third face side in the angled portion, and to prevent the stripe-shaped brightness unevenness extending in the longitudinal direction from occurring on the viewed image. That is, it is possible to secure sufficient reflection even in the peripheral portion close to the boundary with the adjacent face on the second face side in the third face, and thus it is possible to display a bright image with little brightness unevenness.

According to a specific aspect of the invention, in the method of manufacturing a virtual image display device, the reflection unit covering the ridge line vicinity area on the third face side has a predetermined thickness or more to perform non-transparent reflection.

According to another specific aspect of the invention, in the method of manufacturing a virtual image display device, in the forming of the reflection unit, the film is formed up to the ridge line vicinity area (the first ridge line vicinity area) on the second face side in the angled portion extending between the second face and the base face of the third face.

According to still another specific aspect of the invention, in the method of manufacturing a virtual image display device, in the forming of the reflection unit, a mask that prevents a film material from being adhered to the outside of the ridge line vicinity area (the first ridge line vicinity area) of the second face is disposed.

According to yet another specific aspect of the invention, in the method of manufacturing a virtual image display device, the reflection unit is formed by forming an aluminum film. The aluminum film is formed by, for example, evaporation. The film may be formed by plating, coating, spraying, dipping, roll coating, and wetting.

BRIEF DESCRIPTION OF THE DRAWINGS

The invention will be described with reference to the accompanying drawings, wherein like numbers reference like elements.

FIG. 4A is a conceptual diagram illustrating expansion of a light path in a first longitudinal direction, and FIG. 4B is a conceptual diagram illustrating expansion of a light path in a second transverse direction.

FIG. 9A to FIG. 9D are diagrams illustrating processes of forming a reflection unit.

DESCRIPTION OF EXEMPLARY EMBODIMENTS

First Embodiment

Hereinafter, a virtual image display device according to a first embodiment of the invention will be described in detail with reference to the drawings.

A. Appearance of Virtual Image Display Device

Figure 1:
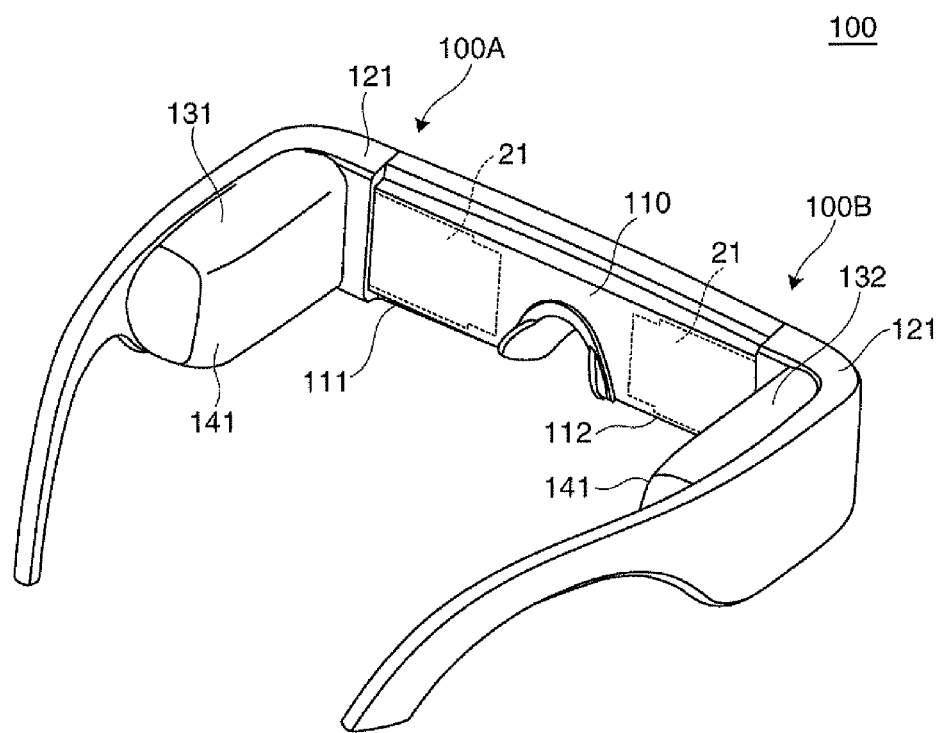
FIG. 1 is a perspective view illustrating a virtual image display device according to a first embodiment.

A virtual image display device 100 of the first embodiment shown in FIG. 1 is a head mount display having appearance such as glasses, can allow a viewer equipped with the virtual image display device 100 to recognize the image light based on the virtual image, and can allow the viewer to view an outside image by see-through. The virtual image display device 100 includes an optical panel 110 that covers the eyes of the viewer, a frame 121 that supports the optical panel 110, and first and second driving units 131 and 132 that are provided from armors of the frame 121 to temples. The optical panel 110 has a first panel unit 111 and a second panel unit 112, and both panel units 111 and 112 are plate-shaped components integrally connected at the center. A first display device 100A formed by combining the first panel unit 111 and the first driving unit 131 on the left side in FIG. 1 is apart for forming a virtual image for a left eye and serves as a virtual image display device even alone. A second display device 100B formed by combining the second panel unit 112 and the second driving unit 132 on the right in FIG. 1 is a part for forming a virtual image for a right eye and serves as a virtual image display device even alone. The first driving unit 131 and the second driving unit 132 are individually housed in cases 141 for light shielding and protection.

B. Structure of Display Device

Figure 2A:
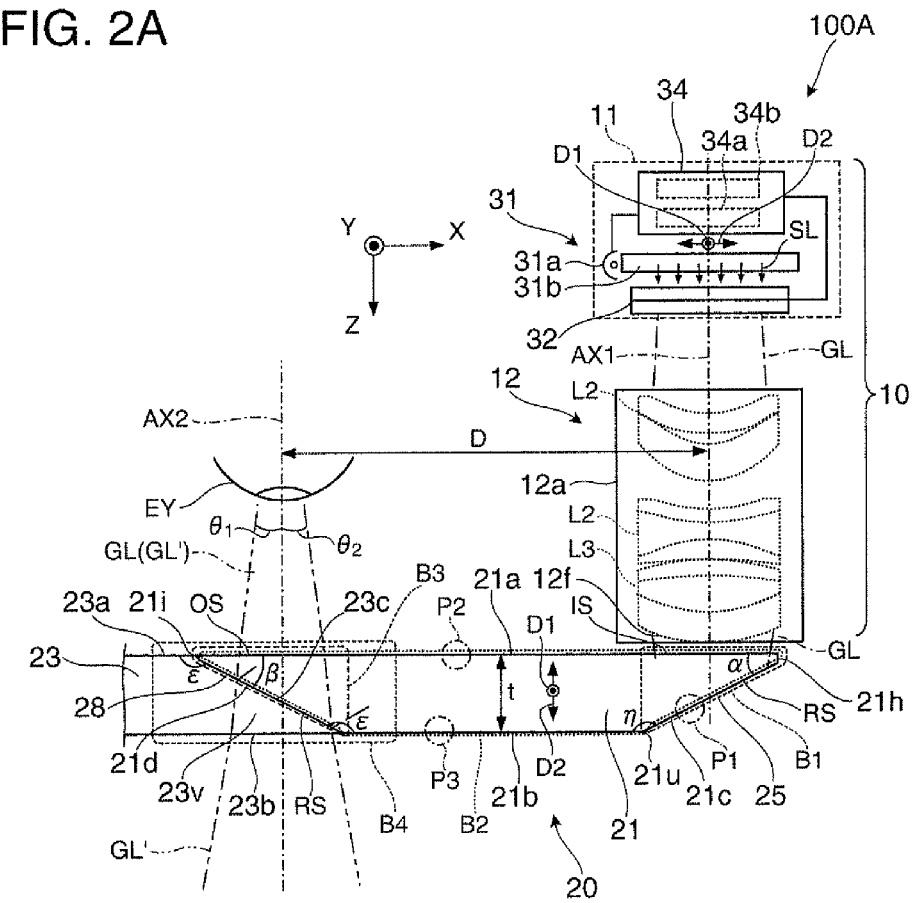
FIG. 2A is a plan view illustrating a main body portion of a first display device constituting the virtual image display device.
Figure 2B:
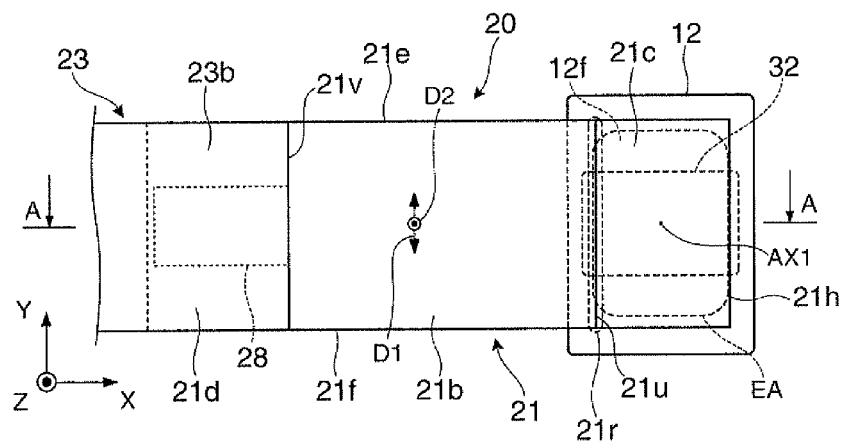
FIG. 2B is a front view illustrating the main body portion.

As shown in FIG. 2A and the like, the first display device 100A includes an image forming device 10 and a light guide device 20. The image forming device 10 corresponds to the first driving unit 131 in FIG. 1, and the light guide device 20 corresponds to the first panel unit 111 in FIG. 1. In the image forming device 10, the main body portion except for the case 141 in FIG. 1 is shown. In FIG. 2A, a part of the light guide device 20 is a cross-sectional view taken along the line A-A of FIG. 2B. The second display device 100B shown in FIG. 1 has the same structure as that of the first display device 100A, in which the left and right are reversed, and thus detailed description of the second display device 100B is omitted.

The image forming device 10 has an image display device 11, and an optical projection system 12. The image display device 11 has an illumination device 31 that emits 2-dimensional illumination light SL, a liquid crystal display device (a liquid crystal display element) 32 that is a transparent image light forming unit, and a driving control unit 34 that controls operations of the illumination device 31 and the liquid crystal display device 32.

The illumination device 31 has a light source 31a that is a light emission unit generating light including three colors of red, green, and blue, and a back light guide unit 31b that diffuses the light from the light source 31a to be a light flux having 2-dimensional extension of a rectangular cross section. The liquid crystal display device (the image light forming unit) 32 spatially modulates the illumination light SL from the illumination device 31, and forms image light to be a display target such as a moving image. The driving control unit 34 is provided with a light source driving circuit 34a, and a liquid crystal driving circuit 34b. The light source driving circuit 34a supplies power to the light source (the light emission unit) 31a of the illumination device 31 to emit the illumination light SL with stable brightness. The liquid crystal driving circuit 34b outputs an image signal or a driving signal to the liquid crystal display device (the image light forming unit) 32 to form image light with a color that is a background of a moving picture and a still image as a transmittance pattern. The liquid crystal driving circuit 34b may have an image processing function, but a control circuit attached to the outside may have the image processing function.

In the liquid crystal display device 32, the first direction D1 is perpendicular to the first optical axis AX1 passing through the optical projection system 12, and is a direction parallel to an intersection line (a corner 21u) of the first reflection face 21a and the third reflection face 21c of a light guide member 21 to be described later, and the second direction D2 is perpendicular to the first optical axis AX1, and is a direction perpendicular to an intersection line (a corner 21u) of the first reflection face 21a and the third reflection face 21c. That is, at the position of the liquid crystal display device 32, the first direction D1 corresponds to a longitudinal Y direction, and the second direction D2 corresponds to a transverse X direction. The first direction D1 is parallel to the image forming device 10 and the light guide member 21 to be described later in the Y direction, and corresponds to a non-bending direction or a non-confinement direction of the light guide member 21 to be described later. Meanwhile, the second direction D2 is parallel to the image forming device 10 in the X direction, but is parallel to the light guide member 21 to be described later in the Z direction, and corresponds to a return direction or a confinement direction.

The optical projection system 12 is a collimation lens that makes the image light emitted from each point on the liquid crystal display device 32 into light flux in a parallel state. The optical projection system 12 has, for example, lens groups L1 to L3, and a lens tube 12a that supports the lens groups L1 to L3 from the surroundings is housed in the case 141 shown in FIG. 1. Each optical face of lenses constituting the lens groups L1 to L3 has a rotation symmetric spherical surface or an aspheric surface around the first optical axis AX1, and light collection characteristics in the first direction D1 and light collection characteristics in the second direction D2 are the same.

The light guide device 20 is formed by adhering the light guide member 21 and the light transmission member 23, and overall constitutes an optical member having a flat-board shape extending in parallel to an XY plane.

The light guide member 21 of the light guide device 20 is a trapezoid prism-shaped member in plan view, and has the first reflection face (the first face) 21a, the second reflection face (the second face) 21b, the third reflection face (the third face) 21c, and the fourth reflection face (the fourth face) 21d, as side faces. The light guide member 21 has the first side face 21e and the second side face 21f that are adjacent to the first, second, third, and fourth reflection faces 21a, 21b, 21c, and 21d and are opposed to each other. The first and second reflection faces (the first and second faces) 21a and 21b extend along the XY plane, and are separated only by a thickness t of the light guide member 21. The third reflection face (the third face) 21c is inclined by an acute angle α equal to or less than 45' with respect to the XY plane, and the fourth reflection face (the fourth face) 21d is inclined by an acute angle β, for example, equal to or less than 45° with respect to the XY plane. In other words, the third reflection face 21c forms an obtuse angle η with respect to the second reflection face 21b, and the fourth reflection face 21d also forms an obtuse angle ∈ with respect to the second reflection face 21b. The first optical axis AX1 passing through the third reflection face 21c and the second optical axis AX2 passing through the fourth reflection face 21d are disposed in parallel and are separated by a distance D. An end face 21h is provided between the first reflection face 21a and the third reflection face 21c to remove a corner. An end face 21i is provided between the first reflection face 21a and the fourth reflection face 21d to remove a corner. Meanwhile, the corner 21u extending in the Y direction remains between the second reflection face 21b and the third reflection face 21c, and the corner 21v extending in the Y direction remains between the second reflection face 21b and the fourth reflection face 21d. As a result, when the light guide member 21 also includes the end faces 21h and 21i from which the corner is removed, the light guide member 21 has a polyhedron appearance of 8 faces.

The light guide member 21 guides the light using total reflection by the first and second reflection faces 21a and 21b, and has a bending direction based on reflection in the light guiding and a non-bending direction based on reflection in the light guiding. In a case of an image guided by the light guide member 21, a transverse direction of bending and propagating by many times of total reflection in the light guiding, that is, a confinement direction corresponds to the second direction D2 of the liquid crystal display device 32 when the light path progresses to the light source side perpendicularly (in parallel to the Z axis) to the first and second reflection faces 21a and 21b. Meanwhile, a longitudinal direction of non-bending and propagating by reflection in the light guiding, that is, a non-confinement direction corresponds to the first direction D1 of the liquid crystal display device 32 when the light path progresses to the light source side to be described later in parallel to (in parallel to the Y axis) the first and second reflection faces 21a and 21b and the third reflection face 21c. In the light guide member 21, a main light guide direction in which the propagating light flux is directed overall is parallel to the −X direction.

The light guide member 21 is formed of a resin material representing high light transmittance in a visible area. The light guide member 21 is a block-shaped member integrally formed by injection molding, for example, a heat or light-cured resin material is injected into a mold, thereby forming the light guide member 21 by heat curing light or curing. As described above, the light guide member (the block-shaped member) 21 is an integrally formed product, but may be functionally classified into the light incident unit B1, the light guide unit B2, and the light emission unit B3.

The light incident unit B1 is a triangular prism-shaped unit, and has a light incident face IS as a part of the first reflection face 21a and the third reflection face 21c opposed to the light incident face IS. The light incident face IS is a flat face on the back side for receiving the image light GL from the image forming device 10 or on the viewer side, and is opposed to the optical projection system 12 and extends perpendicularly to the first optical axis AX1. The third reflection face 21c has a rectangular outline, and has a mirror layer 25 that is a non-transparent reflection unit for reflecting the image light GL passing through the light incident face IS and directing it to the light guide unit B2, over substantially the whole of the rectangular area.

Figure 3A:
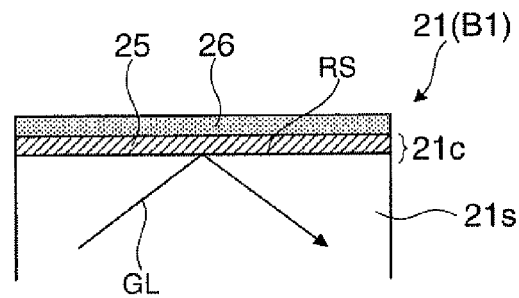
FIG. 3A is a diagram illustrating a structure of a third face in a light incident unit of a light guide device.

FIG. 3A is a diagram illustrating the third reflection face 21c, and is a partially enlarged cross-sectional view of a surface portion SP1 in the light incident unit B1. The third reflection face 21c has the mirror layer (the reflection unit) 25 and is coated with a protective layer 26. The mirror layer 25 is formed by performing total reflection coating and forming a film of Al (aluminum) or the like on the inclined face RS of the main body portion 21s of the light guide member 21. Specifically, the mirror layer 25 is formed by evaporation, and has a thickness of about 0.5 to 1 µm. The third reflection face 21c is inclined with respect to the first optical axis AX1 of the optical projection system 12 or the XY plane, for example, by an acute angle α=25' to 27', and reliably binds the image light GL into the light guide unit B2 by bending the image light GL input from the light incident face IS and directed overall to the +Z direction to be directed overall from the −Z direction to the −X direction. As the base of the mirror layer 25, a hard coating layer may be formed in advance.

Returning to FIG. 2A and the like, the light guide unit B2 has the first reflection face 21a and the second reflection face 21b that totally reflect the image light bent by the light incident unit B1, as two planes opposed to each other and extending in parallel to the XY plane. A gap between the first and second reflection faces 21a and 21b, that is, the thickness t of the light guide member 21 is, for example, about 9 mm. Herein, the first reflection face 21a is on the back side close to the image forming device 10 or on the viewer side, and the second reflection face 21b is on the front side far away from the image forming device 10 or on the outside. In this case, the first reflection face 21a is a common face portion with the light incident face IS or the light emission face OS to be described later. The first and second reflection faces 21a and 21b are total reflection faces using a difference in refractive index, and the surface thereof is not subjected to the non-transparent reflection coating such as the mirror layer.

Figure 3B:
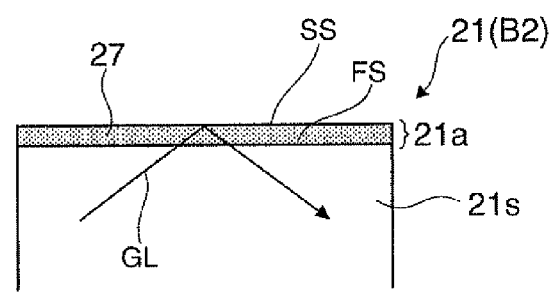
FIG. 3B and FIG. 3C are diagrams illustrating structures of first and second faces in the light guide unit of the light guide device.
Figure 3C:
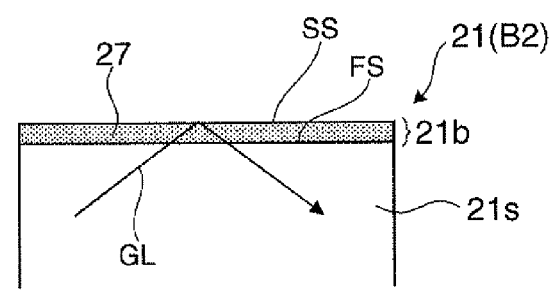

FIG. 3B is a diagram illustrating the first reflection face 21a, and is a partially enlarged cross-sectional view of the surface portion SP2 in the light guide unit B2 of the light guide member 21. FIG. 3C is a diagram illustrating the second reflection face 21b, and is a partially enlarged cross-sectional view of the surface portion SP3 in the light guide unit B2 of the light guide member 21. The first and second reflection faces 21a and 21b have a structure of being coated with the hard coating layer 27 to prevent a surface from being damaged and prevent resolution of a picture from being decreased. The hard coating layer 27 is formed by forming a film of a coating agent formed of resin or the like on the flat face FS of the main body portion 21s of the light guide member 21 by a dip process or a spray coating process.

Returning to FIG. 2A and the like, first, the image light GL reflected by the third reflection face 21c of the light incident unit B1 is input to the first reflection face 21a and is totally reflected. Then, the image light GL is input to the second reflection face 21b and is totally reflected. Hereinafter, this operation is repeated, and the image light is overall directed in the main light guide direction on the back side of the light guide device 20, that is, to the −X side on which the light emission unit B3 is provided. Since the first and second reflection faces 21a and 21b are not subjected to the non-transparent or semi-transmittance reflection coating, the outside light or the outer light input from the outside to the second reflection face 21b passes through the light guide unit B2 with high transmittance. That is, the light guide unit B2 is a see-through type capable of perspective viewing of the outside image.

The light emission unit B3 is a triangular prism-shaped unit, and has a light emission face OS as a part of the first reflection face 21a and the fourth reflection face 21d opposed to the light emission face OS. The light emission face OS is a back side plane for emitting the image light GL to the eye EY of the viewer, is a part of the first reflection face 21a similarly to the light incident face IS, and extends vertically to the second optical axis AX2. A distance D between the second optical axis AX2 passing through the light emission unit B3 and the first optical axis AX1 passing through the optical incident unit B1 is set to, for example, 50 mm considering a width or the like of a head of the viewer. The fourth reflection face 21d is a substantially rectangular flat face for reflecting the image light GL input through the first and second reflection faces 21a and 21b and emitting the image light GL out of the light emission unit 53. A half mirror layer 28 is attached to the fourth reflection face 21d. The half mirror layer 28 is a reflection film (that is, a semi-transmittance reflection film) having light transmittance. The half mirror layer (the semi-transmittance reflection film) 28 is formed by forming a metal reflection film or a dielectric multilayer film on the inclination face RS of the main body portion 21s of the light guide member 21. The reflectance of the half mirror layer 28 with respect to the image light GL is equal to or more than 10% and equal to or less than 50% in an assumed incident angle range of the image light GL from the viewpoint that the outside light GL' based on the see-through being easily viewed. The reflectance of the half mirror layer 28 with respect to the image light GL of a specific example is set to, for example, 20%, and the transmittance with respect to the image light GL is set to, for example, 80%.

Figure 3D:
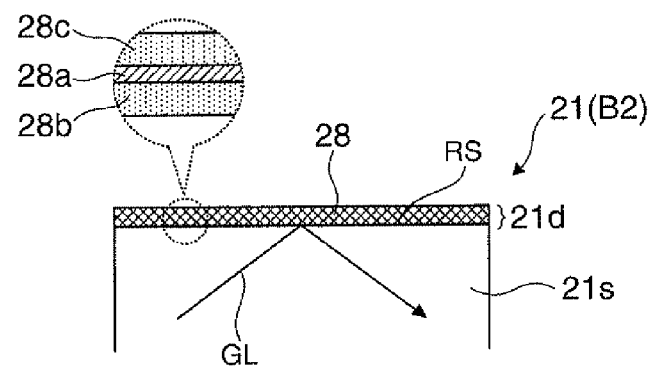
FIG. 3D is a diagram illustrating a structure of a fourth face in a light emission unit of the light guide device.

FIG. 3D is a diagram illustrating the fourth reflection face 21d and a structure therearound, to which a cross-sectional enlarged view of the half mirror layer (the semi-transmittance reflection film) 28 is attached. Clearly from FIG. 3D, the half mirror layer (the semi-transmittance reflection) 28 has a sandwich structure in which a metal reflection film 28a, a first dielectric multilayer film 28b, and a second dielectric multilayer film 28c are laminated such that the metal reflection film 28a is interposed therebetween. The metal reflection film 28a is formed of a material, for example, Ag or Al. The lower first dielectric multilayer film 28b or the upper second dielectric multilayer film 28c is formed by laminating, for example, a plurality of transparent dielectric layers, and improves angle characteristics of the metal reflection film 28a. However, the dielectric multilayer films 28b and 28c may be omitted.

Returning to FIG. 2B, the fourth reflection film 21d is inclined by, for example, an acute angle α=25° to 27° with respect to the second optical axis AX2 perpendicular to the first reflection face 21a or the XY plane, partially reflects the image light GL input through the first and second reflection faces 21a and 21b of the light guide unit B2 to bend the image light GL to be directed overall to the −Z direction by the half mirror layer 28, to allow the image light GL to pass through the light emission face OS. The image light GL passing through the fourth reflection face 21d is input to the light transmission member 23, and is not used to form a picture.

The light transmission member 23 has the same refractive index as that of the main body of the light guide member 21, and has a first face 23a, a second face 23b, and a third face 23c. The first and second faces 23a and 23b extend along the XY face. The third face 23c is inclined with respect to the XY plane, and is opposed to and disposed in parallel to the fourth reflection face 21d of the light guide member 21. That is, the light transmission member 23 is a member having a wedge-shaped portion 23v interposed between the second face 23b and the third face 23c. Similarly to the light guide member 21, the light transmission member 23 is formed of a resin material representing high light transmittance in a visible range. The light transmission member 23 is a block-shaped member integrally formed by injection molding, for example, a heat-cured resin material is injected into a mold, thereby forming the light transmission member 23 by heat curing.

In the light transmission member 23, the first face 23a is disposed on the extending plane of the first reflection face 21a provided in the light guide member 21, and is on the back side close to the eye EY of the viewer, and the second face 23b is disposed on the extending plane of the second reflection face 21b provided in the light guide member 21, and is on the front side far away from the eye EY of the viewer. The third face 23c is a rectangular transmission face bonded to the fourth reflection face 21d of the light guide member 21 by an adhesive. An angle formed by the first face 23a and the third face 23c is the same as the angle ∈ formed by the second reflection face 21b and the fourth reflection face 21d of the light guide member 21, and an angle formed by the second face 23b and the third face 23c is the same as the angle β formed by the first reflection face 21a and the third reflection face 21c of the light guide member 21.

The light transmission member 23 and the light guide member 21 constitute a projection unit B4 at a portion opposed to the eyes of the viewer at the connection portion of both and in the vicinity thereof. The wedge-shaped portion 23v interposed between the second face 23b and the third face 23c forming an acute angle with each other and extending in the −X direction in the light transmission member 23 is adhered to the same wedge-shaped light emission unit B3 to constitute a center portion with respect to the X direction in the overall flat board-shaped projection unit B4. The first and second faces 23a and 23b are not subjected to reflection coating such as a mirror layer, and thus allow the outside light GL' to pass with high transmittance similarly to the light guide unit B2 of the light guide member 21. The third face 23c can also allow the outside light GL' to pass with high transmittance, but the fourth reflection face 21d of the light guide member 21 has the half mirror layer 28, and thus the outside light GL' passing through the third face 23c is dimmed by, for example, 20% with respect to the half mirror layer 28. That is, the viewer views light formed by overlapping the image light GL dimmed to 20% and the outside light GL' dimmed to 80%, over the half mirror layer 28. The first and the second faces 23a and 23b may have a coating structure with a hard coating layer.

C. Outline of Light Path of Image Light

FIG. 4A is a diagram illustrating a light path in the first direction D1 corresponding to a longitudinal cross section CS1 of the liquid crystal display device (the image light forming unit) 32. On the longitudinal cross section along the first direction D1, that is, the YZ plane (the Y' Z' plane after expansion), a component emitted from the upper end side (the +Y side) of the display area 32b indicated by a chain line in FIG. 4A in the image light emitted from the liquid crystal display device 32 is image light GLa, and a component emitted from the lower end side (the −Y side) of the display area 32b indicated by a two-dot chain line in FIG. 4A is image light GLb.

The upper image light GLa becomes parallel light flux by the optical projection system 12, and is input obliquely from the upper direction of an angle Φ1 in the parallel light flux state with respect to the eye EY of the viewer through the light incident unit B1, the light guide unit B2, and the light emission unit B3 of the light guide member 21 along the expanded optical axis AX'. Meanwhile, the lower image light GLb becomes parallel light flux by the optical projection system 12, and is input obliquely from the lower direction of an angle Φ2 (|Φ2|=|Φ1|) in the parallel light flux state with respect to the eye EY of the viewer through the light incident unit B1, the light guide unit B2, and the light emission unit B3 of the light guide member 21 along the expanded optical axis AX'. The angles Φ1 and Φ2 correspond to upper and lower half field angles, and are set to, for example, 6.5°.

In the longitudinal direction of the first direction D1, the light guide device 20 does not have a substantial influence on the image forming based on the optical projection system 12, and the optical projection system 12 forms an infinity image of the liquid crystal display device 32, and inputs the corresponding image light to the eye EY of the viewer.

FIG. 4B is a diagram illustrating a light path in the second direction (the confinement or the synthetic direction) D2 corresponding to a transverse cross section CS2 of the liquid crystal display device (the image light forming unit) 32. On the transverse cross section CS2 along the second direction D2, that is, the XZ plane (the X' Z' plane after expansion), a component emitted from a first display point P1 on the right end side (the +X side) toward the display area 32b indicated by a chain line in FIG. 4B in the image light emitted from the liquid crystal display device 32 is image light GL1, and a component emitted from a second display point P2 on the left end side (the −X side) toward the display area 32b indicated by the two-dot chain line in FIG. 4B is image light GL2.

The image light GL1 from the first display point P1 on the right side becomes parallel light flux by the optical projection system 12, and is input obliquely from the right direction of the angle θ1 in the parallel light flux state with respect to the eye EY of the viewer through the light incident unit B1, the light guide unit B2, and the light emission unit B3 of the light guide member 21 along the expanded optical axis AX'. Meanwhile, the image light GL2 from the second display point P2 on the left side becomes parallel light flux by the optical projection system 12, and is input obliquely from the left direction of an angle θ2 (|θ2|=|θ1|) in the parallel light flux state with respect to the eye EY of the viewer through the light incident unit B1, the light guide unit B2, and the light emission unit B3 of the light guide member 21 along the expanded optical axis AX'. The angles θ1 and θ2 correspond to left and right half field angles, and are set to, for example, 10°.

In the transverse direction of the second direction D2, the light guide member 21 bends the image light GL1 and GL2 by reflection, the number of times of reflection at that time is different according to the position on the liquid crystal display device 32, and thus the image light GL1 and GL2 is discontinuously represented in the light guide member 21. As a result, in the transverse direction, the screen is overall reversed left and right. However, as will be described later, the light guide member 21 is processed with high precision, and the right half image of the liquid crystal display device 32 and the left half image of the liquid crystal display device 32 are continuous without a break and are combined without deviation. Considering that the numbers of times of reflection of both of image light GL1 and GL2 in the light guide member 21 are different from each other, the emission angle θ1' of the right image light GL1 and the emission angle θ2' of the left image light GL2 are differently set.

As described above, the image light GLa, GLb, GL1, and GL2 input to the eye EY of the viewer is a virtual image from infinity. In the longitudinal first direction D1, the picture formed on the liquid crystal display device 32 is upright, and in the transverse second direction D2, the picture formed on the liquid crystal display device 32 is reversed.

D. Light Path of Image Light in Transverse Direction

Figure 5:
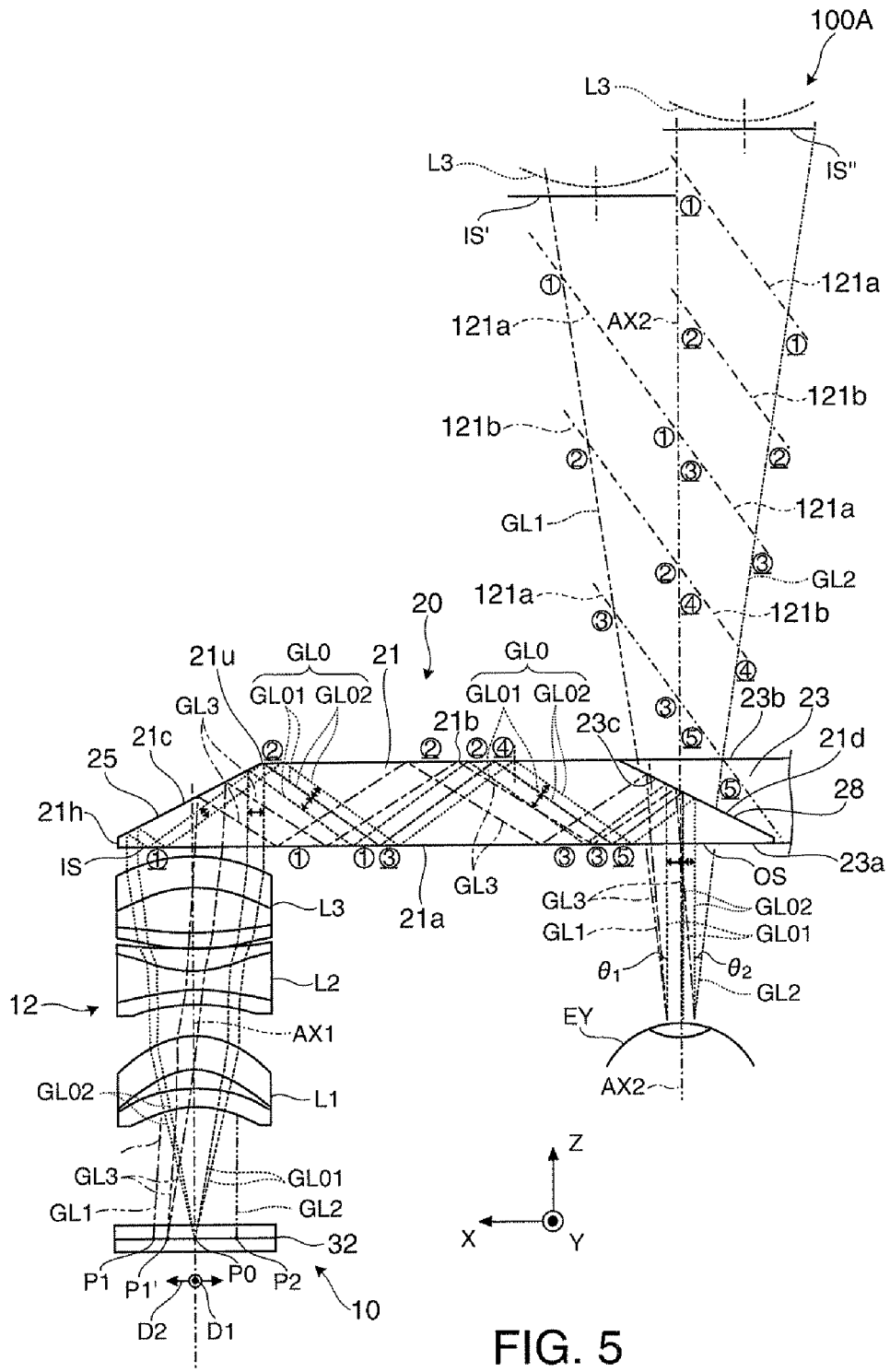
FIG. 5 is a plan view specifically illustrating a light path of an optical system of the virtual image display device.

FIG. 5 is a cross-sectional view illustrating a specific light path in the transverse second direction D2 in the first display device 100A.

Details of the image light GL01, GL1, and GL3 from the center and right display points P0, P1, and P1' of the liquid crystal display device 32 are partially omitted, but the image light passes through the optical projection system 12 to be the parallel light flux, and is input to the light incident face IS of the light guide member 21. The image light GL01, GL1, and GL3 directed into the light guide member 21 repeats to be totally reflected at each unique total reflection angle by the first and second reflection faces 21a and 21b, and is finally emitted as parallel light flux from the light emission face OS. Specifically, the image light GL01, GL1, and GL3 is reflected as the parallel light flux by the third reflection face 21c of the light guide member 21, and then is input to the first reflection face 21a of the light guide member 21 at a relatively large reflection angle and is totally reflected (the first total reflection). Thereafter, the image light GL01, GL1, and GL3 is input to the second reflection face 21b and is totally reflected (the second total reflection), and then is input to the first reflection face 21a again and is totally reflected (the third total reflection). As a result, the image light GL01, GL1, and GL3 is totally reflected a total of three times by the first and second reflection faces 21a and 21b, and is input to the fourth reflection face 21d. The image light GL01, GL1, and GL3 is reflected at the same angle as that of the first of the third reflection face 21c by the fourth reflection face 21d, and is emitted as the parallel light flux in the inclination state of the maximum angle θ1 in the second optical axis AX2 direction perpendicular to the light emission face OS from the light emission face OS.

The image light GL02 and GL2 from the display points P0 and P2 of the center and the left side of the liquid crystal display device 32 passes through the optical projection system 12 to be parallel to the light flux, and is input to the light incident face IS of the light guide member 21. The image light GL02 and GL2 directed into the light guide member 21 repeats to be totally reflected at each unique total reflection angle of the first and second reflection faces 21a and 21b, and is finally emitted as parallel light flux from the light emission face OS. Specifically, the image light GL02 and GL2 is reflected as the parallel light flux by the third reflection face 21c of the light guide member 21, and then is input to the first reflection face 21a of the light guide member 21 at a relatively large total reflection angle and is totally reflected (the first total reflection). Thereafter, the image light GL02 and GL2 is input to the second reflection face 21b and is totally reflected (the second total reflection), is input to the first reflection face 21a again and is totally reflected (the third total reflection), is input to the second reflection face 21b again and is totally reflected (the fourth total reflection), and is input to the first reflection face 21a again and is totally reflected (the fifth total reflection). As a result, the image light GL02 and GL2 is totally reflected a total of five times by the first and second reflection faces 21a and 21b, and is input to the fourth reflection face 21d. The image light GL02 and GL2 is reflected at the same angle as that of the first of the third reflection face 21c by the fourth reflection face 21d, and is emitted as the parallel light flux in the inclination state of the maximum angle θ2 in the second optical axis AX2 direction perpendicular to the light emission face OS from the light emission face OS.

FIG. 5 shows the virtual first face 121a corresponding to the first reflection face 21a when the light guide member 21 is expanded, and shows the virtual second face 121b corresponding to the second reflection face 21b when the light guide member 21 is expanded. By such expansion, the image light GL01, GL1, and GL3 from the display points P0, P1, and P1' passes through an incident equivalent face IS' corresponding to the light incident face IS, then passes through the first face 121a twice, passes through the second faces 121b once, is emitted from the light emission face OS, and is input to the eye EY of the viewer. The image light GL02 and GL2 from the display point P0 and P2 passes through an incident equivalent face IS" corresponding to the light incident face IS, then passes through the first face 121a three times, passes through the second face 121b twice, is emitted from the light emission face OS, and is input to the eye EY of the viewer. In other words, the viewer views the overlapped lens group L3 of the emission end of the optical projection system 12 present in the vicinity of the incident equivalent faces IS' and IS" at two different positions.

Figure 6A:
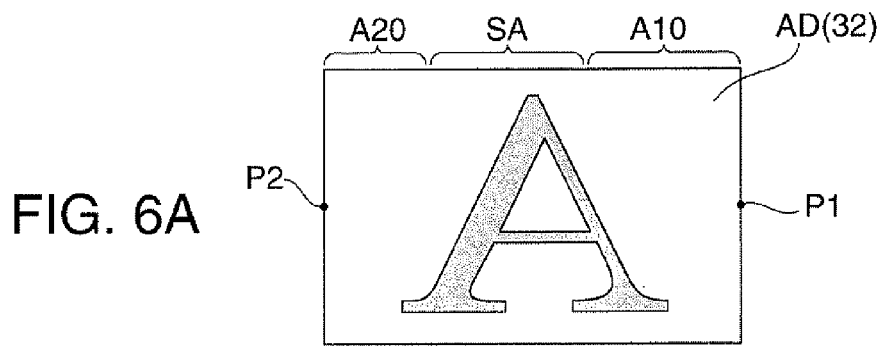
FIG. 6A is a diagram illustrating a display face of a liquid crystal display device.
Figure 6B:
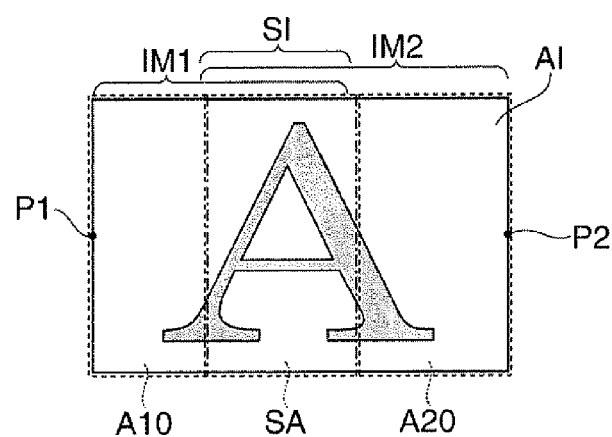
FIG. 6B is diagram conceptually illustrating a virtual image of the liquid crystal display device viewed by a viewer.
Figure 6C:
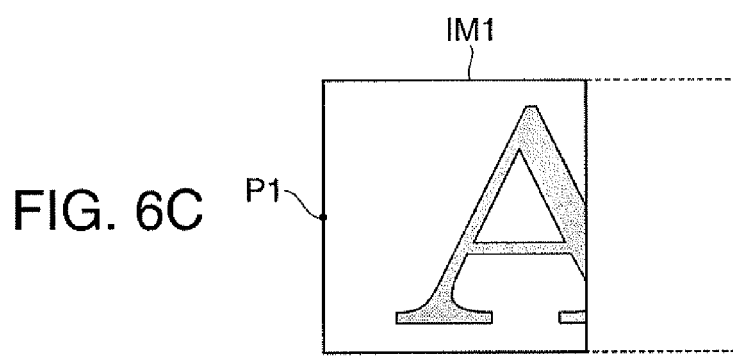
FIG. 6C and FIG. 6D are diagrams illustrating a partial image constituting the virtual image.
Figure 6D:
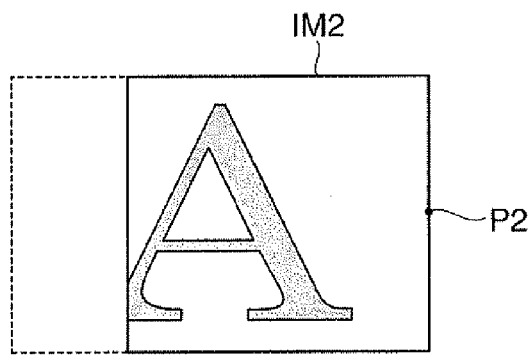

FIG. 6A is a diagram conceptually illustrating the display face of the liquid crystal display device (the image light forming unit), FIG. 6B is a diagram conceptually illustrating the virtual image of the liquid crystal display device 32 viewed by the viewer, and FIG. 6C and FIG. 6D are diagrams illustrating partial images constituting the virtual image. A rectangular image forming area AD provided in the liquid crystal display device 32 shown in FIG. 6A is viewed as a virtual image display area AI shown in FIG. 6B. On the left side of the virtual image display area AI, a first projection image IM1 corresponding to the portion from the center to the right side in the image forming area AD is formed as a virtual image (see FIG. 6C), and the first projection image IM1 is a partial image from which the right side is removed. On the right side of the virtual image display area AI, a projection image IM2 corresponding to a portion from the center to the left side in the image forming area AD of the liquid crystal display device 32 is formed as a virtual image (see FIG. 6D), and the second projection image IM2 is an image from which the left side is removed.

A first partial area A10 of forming only the first projection image (the virtual image) IM1 in the liquid crystal display device 32 shown in FIG. 6A includes, for example, the first display point 21 at the right end of the liquid crystal display device 32, and emits the image light GL01, GL1, and GL3 totally reflected a total of three times in the light guide unit B2 of the light guide member 21. A second partial area A20 of forming only the second projection image (the virtual image) IM2 in the liquid crystal display device 32 includes, for example, the second display point P2 at the left end of the liquid crystal display device 32, and emits the image light GL02 and GL2 totally reflected a total of five times in the light guide unit B2 of the light guide member 21. The image light from a longitudinally extending band SA interposed between the first and second partial areas A10 and A20 in the vicinity of the center of the image forming area AD of the liquid crystal display device 32 forms the superposed image SI shown in FIG. 6B. That is, the image light from the band SA of the liquid crystal display device 32 becomes the first projection image IM1 formed by the image light GL01, GL3, and the like totally reflected a total of three times in the light guide unit B2, and the second projection image 1M2 formed by the image light GL02 and the like totally reflected a total of five times in the light guide unit B2, and is superposed on the virtual image display area AI. When the processing of the light guide member 21 is precise and the light flux accurately collimated by the optical projection system 12 is formed, it is possible to prevent the superposed image SI from deviating or bleeding by the superposition of two projection images IM1 and IM2.

Hereinafter, returning to FIG. 5, the light flux emitted from the display point P0 at the center of the liquid crystal display device 32 will be described in more detail. The image light GL01 and GL02 emitted from the center display point P0 individually propagates in the light guide member 21 in two modes. That is, the image light GL01 emitted to be inclined clockwise in the plan view passes through the light emission face OS, and is input to the area adjacent to the corner 21u between the third reflection face 21c and the second reflection face 21b, and is reflected toward the first reflection face 21a. Meanwhile, the other image light GL02 emitted to be inclined anticlockwise in the plan view passes through the light emission face OS, is input to the area close to the end face 21h between the third reflection face 21c and the first reflection face 21a, and is reflected toward the first reflection face 21a. The image light GL01 input to the vicinity of the corner 21u of the third reflection face 21c is reflected three times in the light guide unit B2, is input to the fourth reflection face 21d, is partially reflected by the fourth reflection face 21d, and is input to the eye EY of the viewer through the light emission face OS. The image light GL02 input to the vicinity of the end face 21h of the third reflection face 21c is input to the first reflection face 21a also serving as the light incident face IS, is totally reflected, is input to the area adjacent to the corner 21u between the second reflection face 21b and the third reflection face 21c, and is totally reflected again. As a result, the image light GL02 is reflected five times in the light guide unit B2, is input to the fourth reflection face 21d, is partially reflected by the fourth reflection face 21d, and is input to the eye EY of the viewer through the light emission face OS. Both of two beams of image light GL01 and GL02 are emitted from the display point P0 of the center of the liquid crystal display device 32, but propagate in the light guide member 21 in two different modes, are finally connected and combined by the fourth reflection face 21d, are emitted along the second optical axis AX2, and are input to the eye EY of the viewer in the overlapped and combined state.

As described above, the image light GL01 and GL02 emitted at different angles in the transverse direction from the display point P0 of the center of the liquid crystal display device 32 is reflected on the peripheral side not at the center of the third reflection face 21c. The image light GL01 and GL02 is individually input to the adjacent area (hereinafter, also referred to as a second ridge line vicinity area) on the third reflection face 21c side, and the adjacent area (hereinafter, also referred to as a first ridge line vicinity area) on the second reflection face 21b side, which are adjacent to each other with the corner 21u interposed between the second reflection face 21b and the third reflection face 21c, and is finally connected and combined. From this, when sufficient reflectance is not secured in the adjacent area on the third reflection face 21c side and in the adjacent area on the second reflection face 21b side with the corner 21u interposed therebetween, the loss of the image light GL01 and GL02 is increased, and the brightness of the center portion (for example, the longitudinal stripe-shaped portion extending in the superposed image SI shown in FIG. 6B) of the liquid crystal display device 32 is decreased. The inventor experimentally confirmed that the reflectance tends to relatively decrease in the adjacent area with the corner 21u interposed between the second reflection face 21b and the third reflection face 21c, and a longitudinally extending stripe-shaped dark portion is easily formed at the center of the screen of the viewed virtual image. To avoid such a phenomenon, as will be described later, the inventor studied keeping the reflectance high in the adjacent areas with the corner 21u interposed therebetween, and experimentally confirmed that it is possible to suppress the phenomenon of forming the longitudinally extending stripe-shaped dark portion at the center of the viewed virtual screen.

For reference, the light flux emitted from the display point P1' close to the periphery of the liquid crystal display device 32 will be described. The image light GL3 emitted from the display point P1' close to the periphery propagates in the light guide member 21 in a single mode. That is, the image light GL3 emitted to be inclined clockwise in the plan view passes through the light emission face OS, is input to the left and right center area of the third reflection face 21c, and is reflected toward the first reflection face 21a. The image light GL3 is reflected three times in the light guide unit B2, is input to the fourth reflection face 21d, is partially reflected by the fourth reflection face 21d, and is input to the eye EY of the viewer from the direction inclined to the left side through the light emission face OS. As described above, the light flux from the periphery of the liquid crystal display device 32 is input to the center area of the third reflection face 21c, and is not connected and combined, and the phenomenon of significantly decreasing the brightness does not easily occur.

E. Method of Suppressing Brightness Unevenness

Figure 7A:
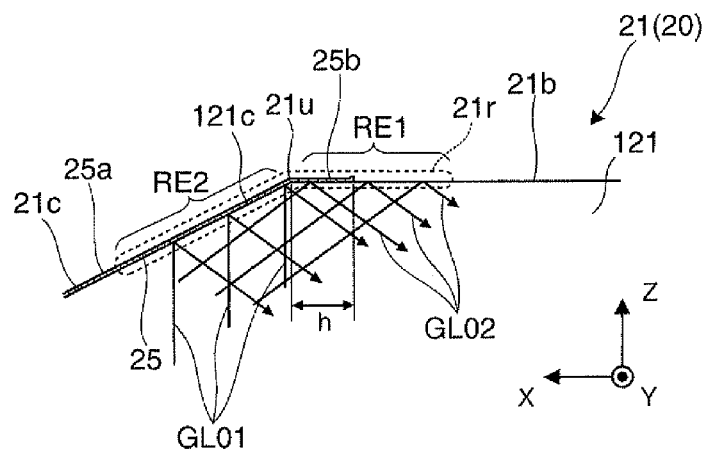
FIG. 7A is a partially enlarged cross-sectional view illustrating a reflection state at a boundary of the second face and the third face.
Figure 7B:
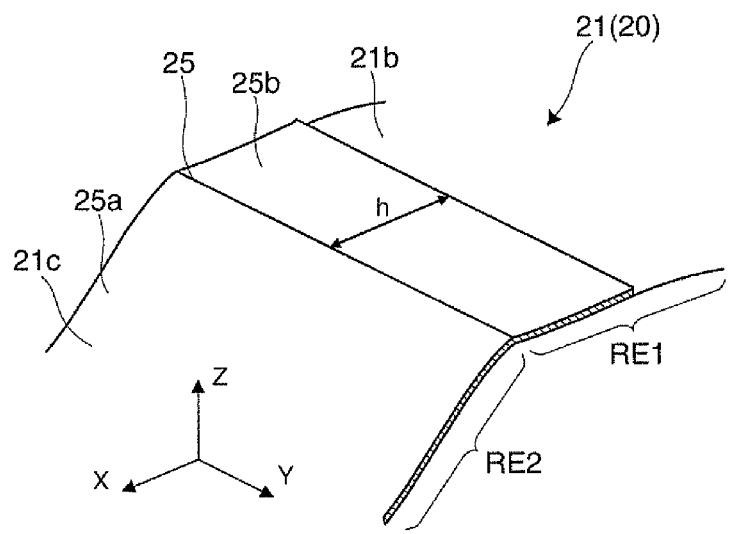
FIG. 7B is a partially enlarged view illustrating a boundary of the second and third faces.
Figure 7C:
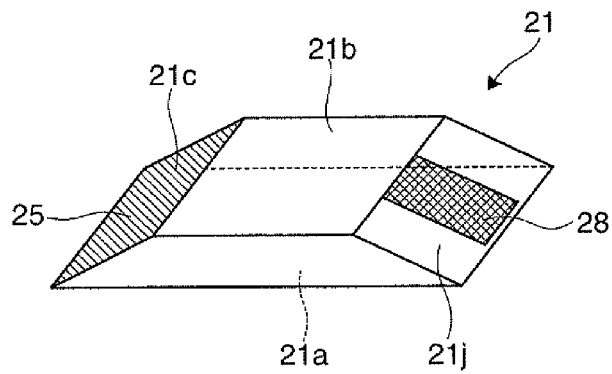
FIG. 7C is an overall perspective view illustrating a light guide body.

FIG. 7A and FIG. 7C are a partially enlarged cross-sectional view and a partial enlarged perspective view illustrating a method of raising the reflectance in the periphery of the boundary between the second reflection face 21b and the third reflection face 21c of the light guide member 21 to suppress the brightness unevenness. Clearly from FIG. 7A and FIG. 7C, the mirror layer (the reflection unit) 25 constituting the third reflection face 21c is formed to extending or overhang on the second reflection face 21b side over the corner 21u. That is, the mirror layer 25 is formed to extending to the first ridge line vicinity area RE1 on the second reflection face 21b side of the angled portion 21r extending between the second reflection face 21b and the base face 121c of the third reflection face 21c, as well as the base face 121c of the third reflection face 21c. As a result, in the angled portion 21r extending to the boundary between the second reflection face 21b and the third reflection face 21c and to the periphery thereof in the mirror layer 25, the main body layer 25a in the second ridge line vicinity area RE2 on the third reflection face 21c side has a thickness (specifically, a thickness equal to or more than 50 nm) sufficient as a mirror. Accordingly, the mirror layer 25 is in a state where sufficient thickness is secured. Also in the second ridge line vicinity area RE2, it is possible to keep the reflectance of the image light GL01 high to suppress the transmittance to be low, and thus it is possible to perform the non-transparent reflection. The protrusion layer 25b in the first ridge line vicinity area RE1 of the mirror layer (the reflection unit) 25 covers the corner 21u side at the end portion of the second reflection face 21b, and is superposed and disposed on the second reflection face 21b. As a result, the outer frame of the protrusion layer 25b forms a level difference with respect to the end portion of the second reflection face 21b.

The protrusion width h to the second reflection face 21b side of the mirror layer 25 is very slight. In the whole perspective view of FIG. 7C, the protrusion to the second reflection face 21b of the mirror layer 25 seems not to be substantially present. That is, the protrusion layer 25b in the first ridge line vicinity area RE1 on the second reflection face 21b side in the angled portion 21r in the mirror layer 25 is thin and narrow from the overall view. Specifically, the protrusion width h in the X direction perpendicular to the angled portion 21r of the protrusion layer 25b of the mirror layer 25 is equal to or less than 0.1 mm. As described above, by suppressing the protrusion amount of the mirror layer 25, it is possible to prevent the total reflection efficiency of the image light GL02 by the second reflection face 21b from being decreased.

Figure 8A:
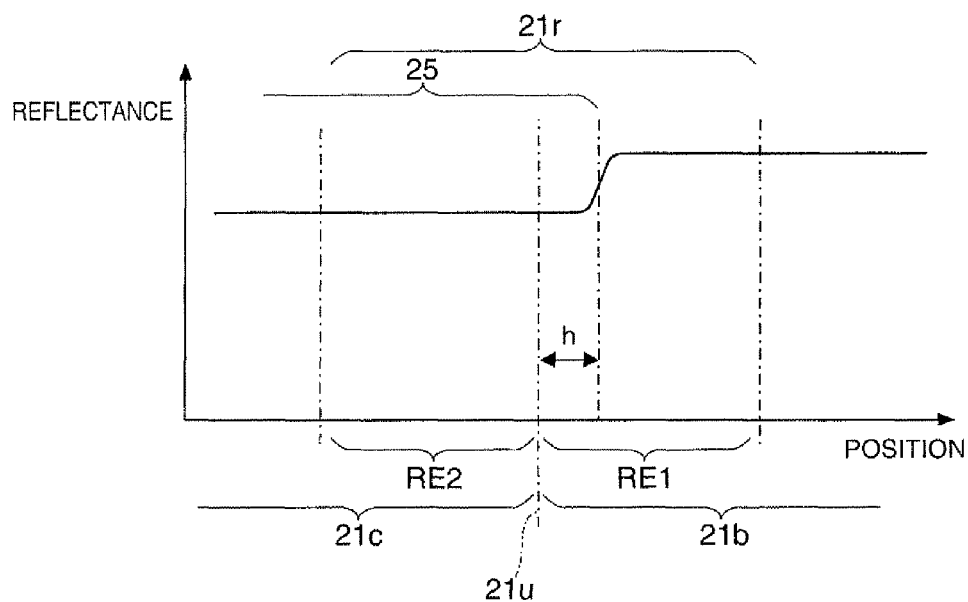
FIG. 8A is a diagram illustrating reflectance at a boundary of the second and third faces in the embodiment.

FIG. 8A is a graph conceptually illustrating the reflection of the image light at the angled portion 21r of the light guide member 21. As shown by a solid line, on the third reflection face 21c side (the portion corresponding to the main body layer 25a) from the corner 21u, the mirror layer (the reflection unit) 25 coats the main body 121 of the light guide member 21 with a sufficient thickness, and relatively high reflectance (for example, equal to or more than 85%) with respect to the image light GL01 is secured. On the second reflection face 21b side from the corner 21u, relatively high reflectance (for example, equal to or more than 85%) with respect to the image light GL02 is secured in the area (the portion corresponding to the protrusion layer 25b) where the coating of the mirror layer 25 is present, and higher reflectance (specifically, about 100%) is secured in the area where the coating of the mirror layer 25 is not present. That is, since the protrusion width h to the second reflection face 21b side of the mirror layer 25 is suppressed to be smaller, the brightness unevenness is not substantially recognized when the image light GL02 is viewed by the viewer. The main body 121 of the light guide member 21 may be a base material that is a block-shaped member formed of resin, but a hard coating layer may be formed in advance on the surface of the base material formed of resin. When the main body 121 is the base material formed of resin in which the hard coating layer is not formed, for example, the main body 121 partially coated with the mirror layer 25 after forming the mirror layer 25 may be coated overall with the hard coating layer.

Figure 8B:
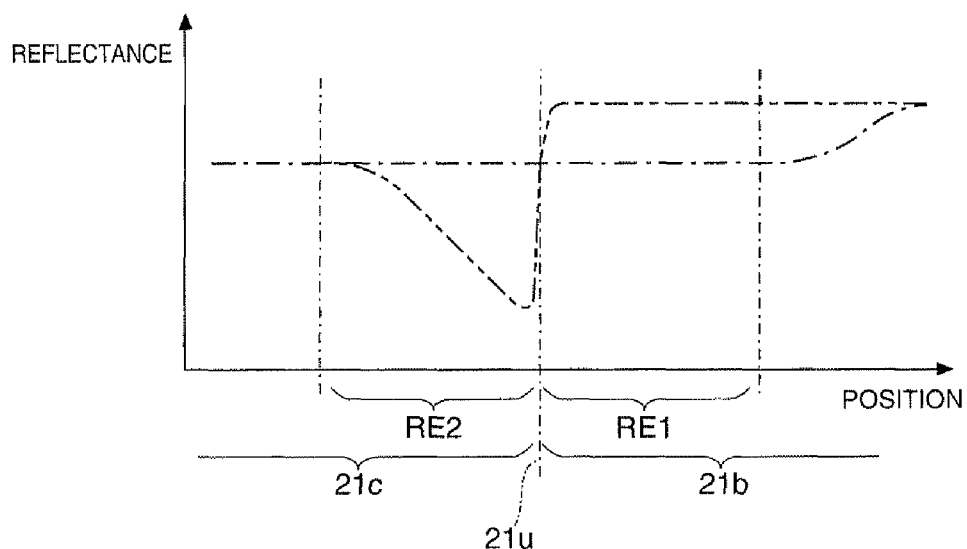
FIG. 8B is a diagram illustrating reflectance of the boundary of the second and third faces in a comparative example.

FIG. 8B is a graph conceptually illustrating a comparative example. In this case, a chain line represents that the protrusion width h to the second reflection face 21b side of the mirror layer 25 is large, and is drastically over the first ridge line vicinity area RE1. As a result, the reflectance on the second ridge light vicinity area RE2 side of the angled portion 21r is not decreased, but the decrease in reflectance on the second reflection face 21b side of the angled portion 21r or in the first ridge line vicinity area RE1 is significant. As a result, the loss of the brightness of the image light is increased, and the brightness unevenness occurs. The two-dot chain line represents that the film thickness in the second ridge line vicinity area RE2 of the mirror layer 25 is insufficient, and the mirror layer 25 represents transparency. As a result, there is no reflectance decrease in the second reflection face 21b, but the significant decrease in the reflectance with respect to the second ridge line vicinity area RE2 on the third reflection face 21c side from the corner 21u is viewed, and it is possible to confirm the large brightness unevenness at the time of viewing by the viewer.

F. Forming of Mirror Layer and the Like

Hereinafter, a process of forming the mirror layer 25 constituting the third reflection face 21c or the like of the light guide member 21 will be described with reference to FIG. 9A to FIG. 9D.

As shown in FIG. 9A, first, the main body 121 formed of resin that is the base material of the light guide member 21 is prepared, and the area close to the base face 121c to be the third reflection face 21c in the second reflection face 21b is coated with the adhesive mask 161. In this case, a part of the first ridge line vicinity area RE1 on the second reflection face 21b side in the angled portion 21r is slightly exposed.

Next, as shown in FIG. 9B, a film is formed on the base face 121c to be the third reflection face 21c with the mask 161 adhered, to form the mirror layer 125. The mirror layer 125 spreads on the second reflection face 21b side and is accumulated to cover the surface area of the mask 161, as well as the base face 121c.

Figure 10:
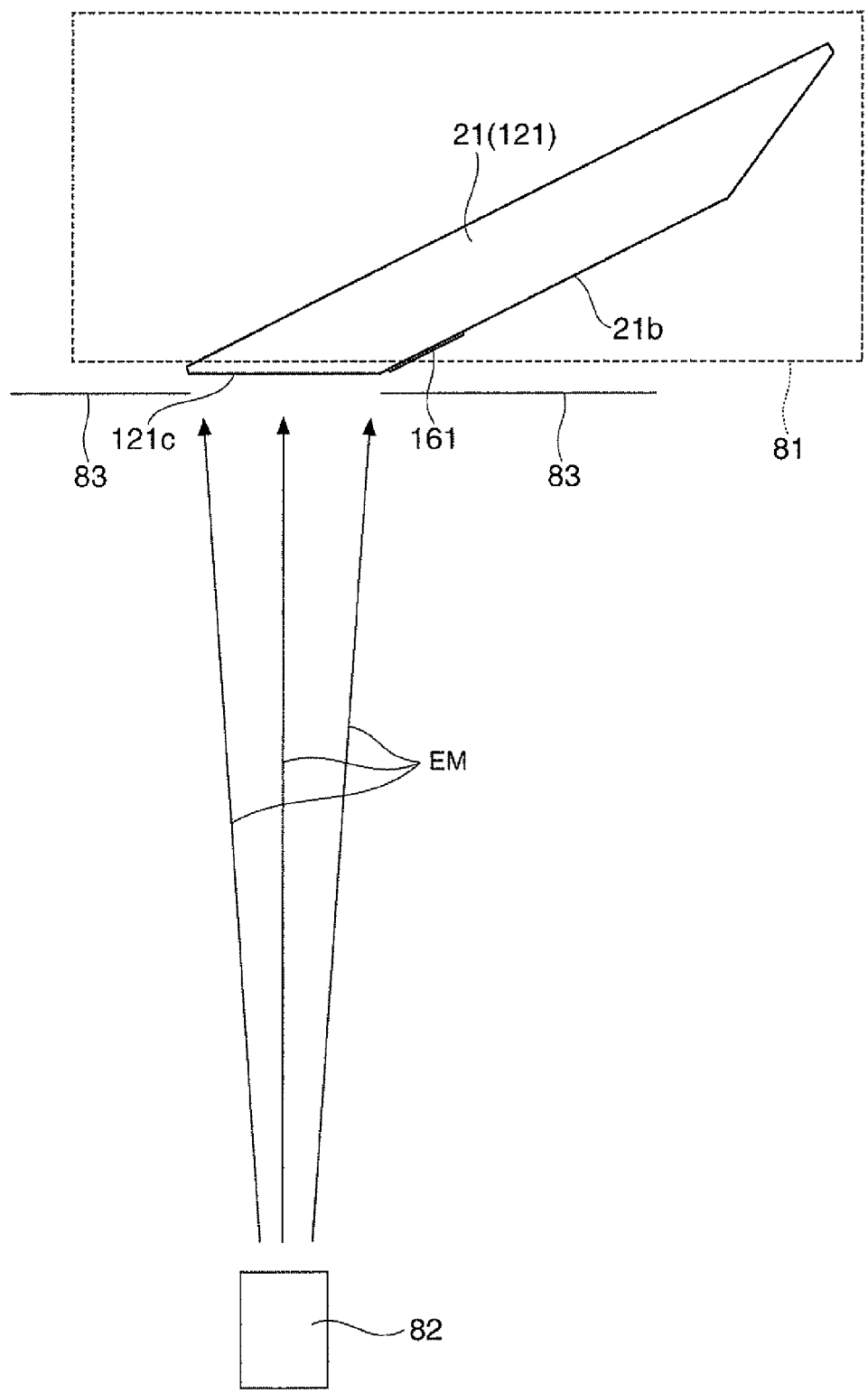
FIG. 10 is a diagram illustrating a film forming process of the reflection unit.

The mirror layer 125 is formed using, for example, vacuum deposition or the like. That is, as shown in FIG. 10, the main body 121 of the light guide member 21 is fixed to a holder 81, and a deposition source 82 such as Al (aluminum) is operated to perform the vacuum deposition. In this case, a cover mask 83 is disposed close to the holder 81 or the base face 121c of the light guide member 21. Accordingly, a deposition material EM that is a film material from the deposition source 82 is blocked, and light is not input to the second reflection face 21b and the like. However, the deposition material (the film material) EM is wrapped on the back of the cover mask 83, and thus a film is partially formed on the mask 161.

Next, as shown in FIG. 9C, the mask 161 is peeled off from the main body 121 of the light guide member 21. Accordingly, as shown in FIG. 9D, a part of the mirror layer 125 is removed, and the mirror layer 25 is completed. The completed mirror layer 25 is provided with the main body layer 25a on the base face 121c, and the protrusion layer 25b on the second reflection face 21b. As described with reference to FIG. 7A to FIG. 7C, the main body layer 25a has sufficient thickness. For example, non-transparent reflection in which the transmittance is equal to or less than 0.1% is realized, the protrusion layer 25b is the relatively small protrusion width h, the total reflection on the second reflection face 21b is prevented from being decreased.

In the above description, as shown in FIG. 9B, the mirror layer 25 is formed using the mask 161, but the mirror layer 25 may be formed without using the mask 161. In this case, it is important to appropriately dispose the cover mask 83 on the main body 121 of the light guide member 21 shown in FIG. 10.

In the virtual image display device 100 of the first embodiment, for example, the mirror layer 25 has the thickness equal to or more than 50 nm for performing the non-transparent reflection in which the transmittance is equal to or less than 0.1% in the second ridge line vicinity area RE2 of the third reflection face side 21c in the angled portion 21r extending between the third reflection face 21c and the second reflection face 21b. Accordingly, it is possible to prevent the reflectance of the image light in the second ridge line vicinity area RE2 (that is, the peripheral portion on the light guide unit B2 side in the third reflection face 21c) from being decreased, and thus it is possible to prevent the stripe-shaped brightness unevenness longitudinally extending with respect to the viewed image from occurring. That is, in the virtual image display device 100, it is possible to secure sufficient reflection even in the peripheral portion close to the boundary with the second reflection face 21b in the third reflection face 21c, and it is possible to display the bright image with little brightness unevenness.

Second Embodiment

Hereinafter, a virtual image display device according to a second embodiment will be described. The virtual image display device according to the embodiment is a modification example of the virtual image display device 100 according to the first embodiment, and is the same as the first virtual image display device 100 when there is no particular description.

Figure 11A:
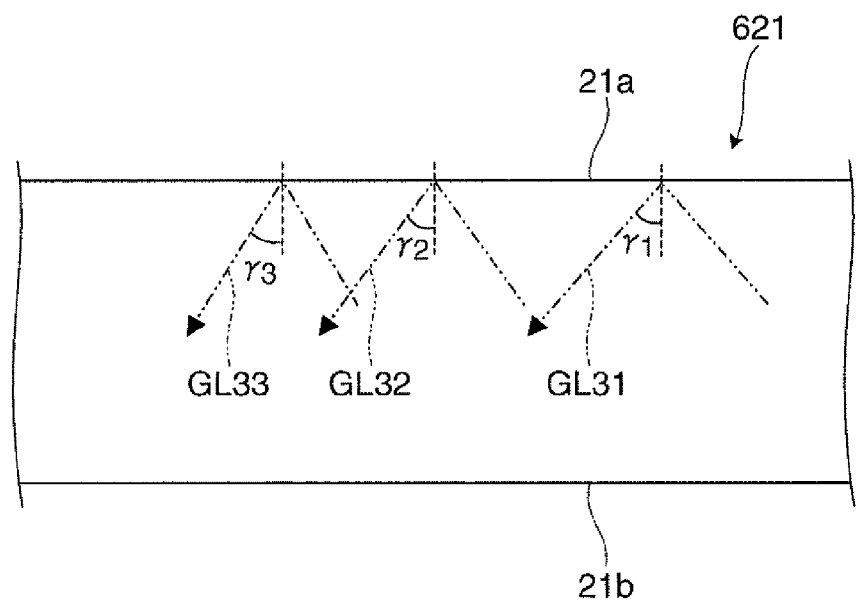
FIG. 11A and FIG. 11B are diagrams illustrating a virtual image display device according to a second embodiment.
Figure 11B:
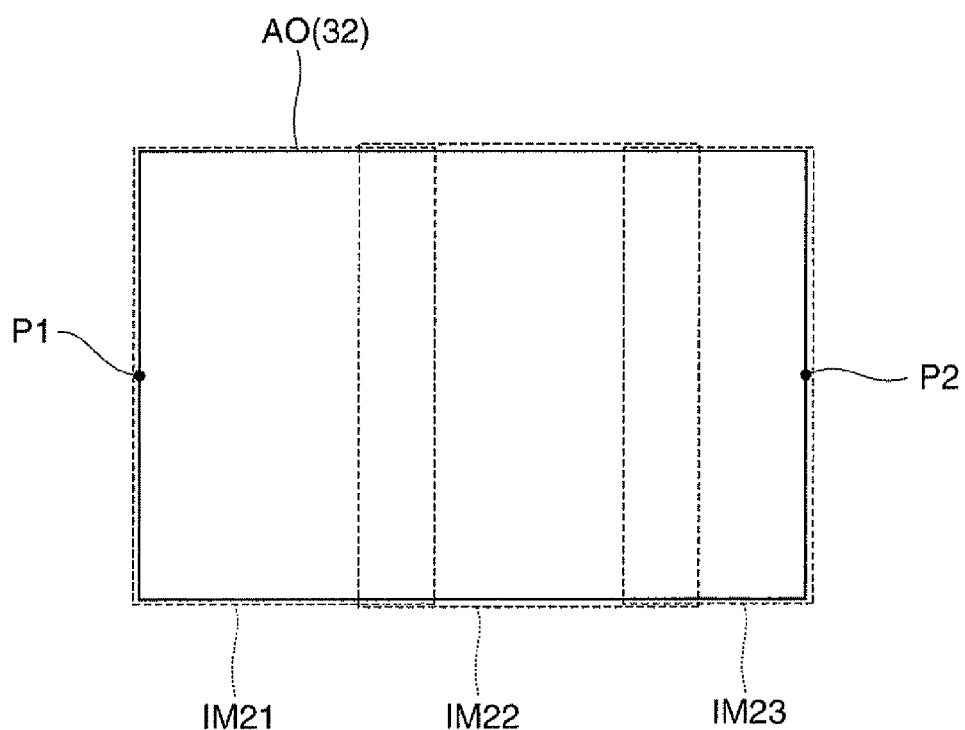

FIG. 11A is a diagram illustrating a light guide member 621 formed by modifying the light guide member 21 shown in FIG. 2A and the like. In the above description, the image light propagating in the light guide member 21 is totally reflected at two reflection angles with respect to the first and second reflection faces 21a and 21b and propagates in two modes. However, as shown in the light guide member 621 of the modification example shown in FIG. 11A, three components of image light GL31, GL32, and GL33 may be allowed to reflect at reflection angles γ1, γ2, and γ3 (γ1>γ2>γ3). In this case, the image light GL emitted from the liquid crystal display device 32 propagates in three modes, is synthesized at the position of the eye EY of the viewer, and is recognized as a virtual image. In this case, as shown in FIG. 11B, a projection image iM21, for example, a total of three times of total reflection is formed on the left side of a valid display area A0, a projection image IM22, for example, a total of five times of total reflection is formed close to the center of the valid display area A0, and a projection image IM 23, for example, a total of seven times of total reflection is formed on the right side of the valid display area A0. Also in this case, although not described in detail, the mirror layer 25 has sufficient thickness in the second ridge line vicinity area RE2 on the third reflection face 21c side in the angled portion 21r extending between the third reflection face 21c and the second reflection face 21b, and thus it is possible to prevent the longitudinally extending brightness unevenness from occurring.

Third Embodiment

Hereinafter, a virtual image display device according to a third embodiment will be described. The virtual image display device according to the embodiment is a modification example of the virtual image display device 100 according to the first embodiment, and is the same as the first virtual image display device 100 when there is no particular description.

Figure 12:
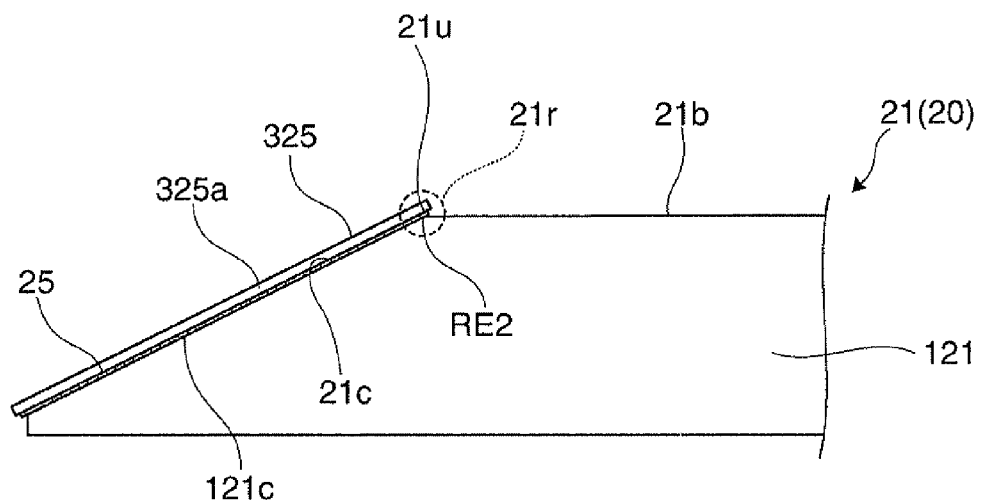
FIG. 12 is a diagram illustrating a virtual image display device according to a third embodiment.

As shown in FIG. 12, the third reflection face 21c of the light guide member 21 is formed by adhering a mirror member 325 on the base face 121c using an adhesive. The mirror member 325 is formed by forming the mirror layer 25 on the substrate 325a, and an area of the mirror layer 25 is broader than the third reflection face 21c, and sufficiently covers the based face 121c.

Also in this case of the embodiment, the mirror layer 25 has the thickness equal to or more than 50 nm for performing the non-transparent reflection, for example, equal to or less than 0.1% in the second ridge line vicinity area RE2 on the third reflection face 21c side in the angled portion 21r extending between the third reflection face 21c and the second reflection face 21b.

Fourth Embodiment

Hereinafter, a virtual image display device according to a fourth embodiment will be described. The virtual image display device according to the embodiment is a modification example of the virtual image display device 100 according to the first embodiment, and is the same as the virtual image display device 100 of the first embodiment when there is no particular description.

Figure 13A:
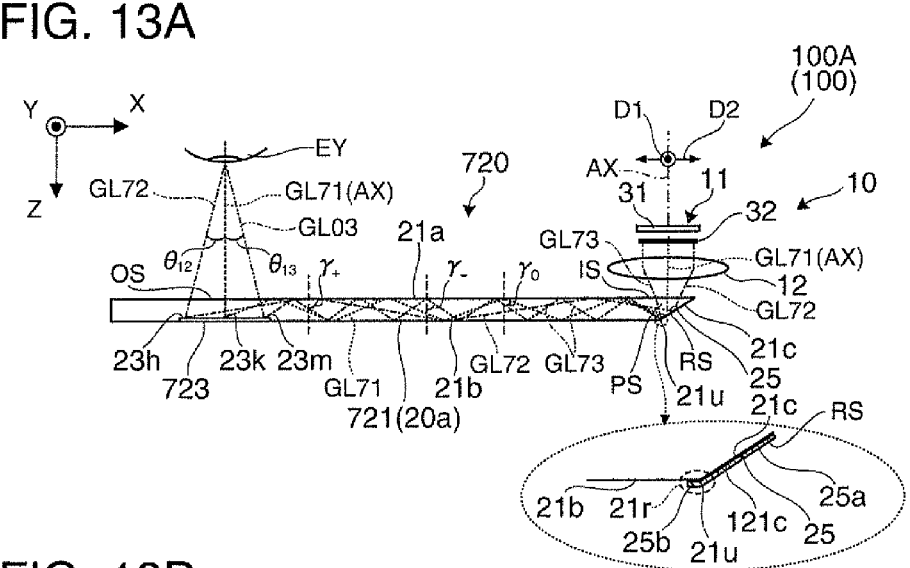
FIG. 13A is a cross-sectional view illustrating a virtual image display device according to a fourth embodiment.
Figure 13B:
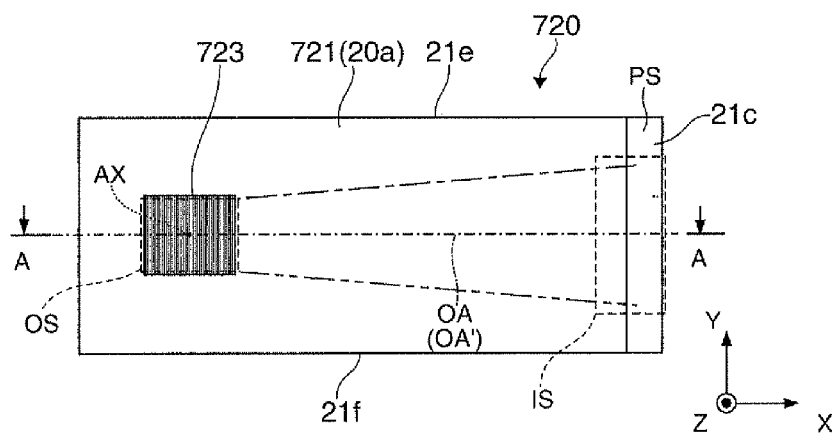
FIG. 13B and FIG. 13C are a front view and a plan view of the light guide device.
Figure 13C:
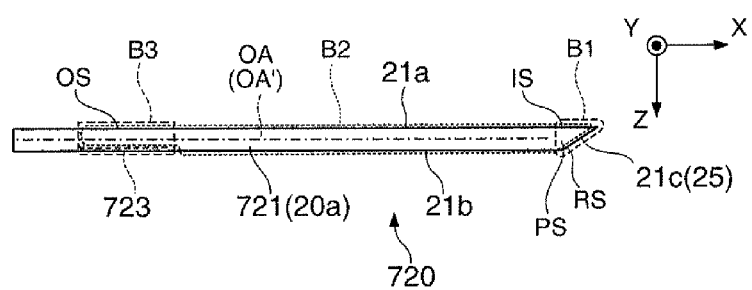

The virtual image display device 100 shown in FIG. 13A to FIG. 13C is provided with a set of an image forming device 10 and a light guide device 720. The light guide device 720 has a light guide member 721 as a part thereof. The light guide member 721 is provided with a light guide body unit 20a, and an angle conversion unit 723 that is an image extraction unit. FIG. 13A corresponds to the cross section A-A of the light guide member 721 shown in FIG. 13B.

An overall appearance of the light guide member 721 is formed by the flat board-shaped light guide body unit 20a extending in parallel to the XY plane in FIG. 13A to FIG. 13C. The light guide member 721 has the first reflection face 21a, the second reflection face 21b, and the third reflection face 21c, as side faces. The light guide member 721 has the first side face 21e and the second side face 21f adjacent to the first, second, and third reflection faces 21a, 21b, and 21c and opposed to each other. The light guide member 721 has an angle conversion unit 723 configured by a plurality of small mirrors embedded in the light guide body unit 20a with respect to one end in the longitudinal direction, and has a structure having a prism unit PS formed to expand the light guide body unit 20a with respect to the other end in the longitudinal direction and the third reflection face 21c attached thereto. The light guide member 721 is an integral component, but may be classified into the light incident unit B1, the light guide unit B2, and the light emission unit B3 (see FIG. 13O) as described in the first embodiment, the light incident unit B1 is a portion having the third reflection face 21c and the light incident face IS to be described later, the light incident unit B1 is a portion having the first and second reflection face 21a and 21b, and the light guide unit B2 is a portion having the angle conversion unit 723 and the light emission face OS to be described later.

The light guide body unit 20a is formed by a light transparent resin material or the like, and has the light incident face IS receiving the image light from the image forming device 10, and the light emission face OS emitting the image light toward the eye EY of the viewer, on the back side opposed to the image forming device 10 in parallel to the XY plane or on the viewer side plane. The light guide body unit 20a has a rectangular inclination face RS in addition to the light incident face IS as the side face of the prism unit PS, and the mirror layer 25 is formed on the inclination face RS to coat it. The mirror layer 25 cooperates with the inclination face RS to serve as the third reflection face 21c that is an incident light bending unit disposed in the state inclined with respect to the light incident face IS. The third reflection face 210 bends the image light input from the light incident face IS and directed overall to the +Z direction, to be directed in the −XZ direction overall oblique to the direction, to reliably combine the image light in the light guide body unit 20a. In the light guide body unit 20a, the angle conversion unit 723 having a micro structure is formed along the plane on the back side of the light emission face OS. The light guide body unit 20a extends from the third reflection face 21c on the entrance side to the angle conversion unit 723 on the back side, and directs the image light input to the inside through the prism unit PS, to the angle conversion unit 723.

The first and second reflection faces 21a and 21b of the light guide member 721 are the main faces of the flat board-shaped light guide body unit 20a and are opposed to each other, and totally reflect the image light bent by the prism unit PS or the light incident unit B1, as two planes extending in parallel to the XY plane. First, the image light reflected by the third reflection face 21c is input to the first reflection face 21a, and is totally reflected. Then, the image light is input to the second reflection face 21b, and is totally reflected. Hereinafter, this operation is repeated, and thus the image light is directed to the backside of the light guide device 720, that is, the −X side on which the angle conversion unit 723 is provided.

The angle conversion unit 723 opposed to the light emission face OS of the light guide body unit 20a is formed along the extending plane of the second reflection face 21b to be close to the extending plane on the back side (the −X side) of the light guide member 721. The angle conversion unit 723 reflects the image light input through the first and second reflection faces 21a and 21b of the light guide member 721, at a predetermined angle, and bends the image light to the light emission face OS side. That is, the angle conversion unit 723 converts the angle of the age light. Herein, the image light input to the angle conversion unit 723 for the first time is an extraction target as the virtual image light. A detailed structure of the angle conversion unit 723 will be described later with reference to FIG. 14A and the like.

The image light emitted from the image forming device 10 and input from the light incident face IS to the light guide member 721 is uniformly reflected and bent by the third reflection face 21c, is repeatedly totally reflected by the first and second reflection faces 21a and 21b of the light guide member 721, propagates in a state having predetermined enlargement along the optical axis AX, is bent at a proper angle by the angle conversion unit 723 to be an extractable state, and is finally emitted from the light emission face OS to the outside. The image light emitted from the light emission face OS to the outside is input as the virtual image light to the eye EY of the viewer. When the virtual image light forms an image on a retina of the viewer, and thus the viewer can recognize the image light such as picture light based on the virtual image.

Hereinafter, the light path of the image light in the light guide member 721 will be described. The light guide device 720 in the fourth embodiment functions similarly to the light guide device 20 shown in FIG. 1A in the longitudinal first direction D1 (the Y direction). Meanwhile, the light guide device 720 guides the image light in a plurality of propagation modes in the transverse second direction D2 (the X direction), and is different from the light guide device 20 shown in FIG. 2A that guides the image light in two propagation modes.

As shown in FIG. 13A, in the image light emitted from the liquid crystal display device (the image light forming unit) 32 of the image display device 11, a component indicated by a dot line emitted from the center portion of the emission face 32a is image light GL71, a component indicated by a chain line emitted from the paper right side (the +X side) of the emission face 32a is image light GL72, and a component indicated by two-dot chain line emitted from the paper left side (the −X side) of the emission face 32a is image light GL73.

The main components of the image light GL71, GL72, and GL73 passing through the optical projection system 12 are input from the light incident face IS of the light guide member 721, and then perform total reflection at angles different from each other with respect to the first and second reflection faces 21a and 21b. Specifically, in the image light GL71, GL72, and GL73, the image light GL71 emitted from the center portion of the emission face 32a of the liquid crystal display device (the image light forming unit) 32 passes through the optical projection system 12, is input as parallel light flux to the light incident face IS, is reflected by the third reflection face 21c, is input to the first reflection face 21a of the light guide member 721 at a standard reflection angle $\gamma_0$, and is totally reflected. Thereafter, the image light GL71 repeats the total reflection by the first and second reflection faces 21a and 21b in a state where the standard reflection angle $\gamma_0$ is kept. The image light GL71 is totally reflected by the first and second reflection faces 21a and 21b N times (N is a natural number), and is input to the center portion 23k of the angle conversion unit 723. The image light GL71 is reflected at a predetermined angle by the center portion 23k, and is emitted as parallel light flux from the light emission face OS in the optical axis AX direction perpendicular to the XY plane including the light emission face OS. The image light GL72 emitted from one end side (the +X side) of the emission face 32a of the liquid crystal display device 32 passes through the optical projection system 12, is input as parallel light flux to the light incident face IS, reflected by the third reflection face 21c, is input to the first reflection face 21a of the light guide member 721 at the maximum reflection angle $\gamma_+$, and is totally reflected. The image light GL72 is totally reflected, for example, N−M times (M is a natural number) by the first and second reflection faces 21a and 21b, is reflected at a predetermined angle by the peripheral portion 23h on the side furthest to the back (the −X side) of the angle conversion unit 723, and is emitted as parallel light flux from the light emission face OS toward a predetermined angle direction. In this case, the emission angle is an acute angle with respect to the +X axis, for return to the third reflection face 21c side. The image light GL73 emitted from the other end side (the −X side) of the emission face 32a of the liquid crystal display device 32 passes through the optical projection system 12, is input as parallel light flux to the light incident face IS, is reflected by the third reflection face 21c, is input at the minimum reflection angle γ− to the first reflection face 21a of the light guide member 721, and is totally reflected. The image light GL73 is totally reflected, for example, N+M times by the first and second reflection faces 21a and 21b, is reflected at a predetermined angle by the peripheral portion 23m on the most entrance side (the +X side) of the angle conversion unit 723, and is emitted as parallel light flux from the light emission face OS in a predetermined angle direction. In this case, the emission angle is an obtuse angle with respect to the +X side, being far away from the third reflection face 21c side.

When an example of a value of a refractive index n of a transparent resin material used in the light guide member 721 is n=1.5, a value of a threshold angle γc thereof is γc≅41.8°, and when it is n=1.6, a value of a threshold angle γc thereof is γc≅38.7°. When the minimum reflection angle γ− of the reflection angles $\gamma_0$, $\gamma_+$ and $\gamma_-$ of the image light GL71, GL72, and GL73 is larger than the threshold angle γc, it is possible to satisfy a total reflection condition in the light guide member 721 in necessary image light.

Hereinafter, a structure of the angle conversion unit 723 and bending of the light path of the image light by the angle conversion unit 723 will be described in detail with reference to FIG. 14A and the like.

First, the structure of the angle conversion unit 723 will be described. The angle conversion unit 723 is configured by a plurality of linear reflection units 2c arranged in a stripe shape. That is, the angle conversion unit 723 is configured by arranging a plurality of longitudinal reflection units 2c extending in the Y direction at a predetermined pitch PT along the main light guide direction in which the light guide member 721 extends, that is, the −X direction. Each reflection unit 2c has a set of a first reflection face 2a that is one reflection face portion disposed on the back side, that is, the light path downstream side, and a second reflection face 2b that is the other reflection face portion disposed on the entrance side, that is, the light path upstream side. At least the second reflection face 2b is a partial reflection face capable of transmitting a part of light, and can cause the viewer to view the outside image by see-through. Each reflection unit 2c has a V shape or a wedge shape in the XZ cross-sectional view by the adjacent first and second reflection faces 2a and 2b. More specifically, the first and second reflection faces 2a and 2b linearly extend, in which a direction extending perpendicularly to the ±X direction as the arrangement direction of arranging the reflection units 2c in parallel to the second reflection faces 21b, that is, the Y direction is the longitudinal direction. The first and second reflection faces 2a and 2b are inclined at different angles (that is, angles different with respect to the XY plane) with respect to the second reflection face 21b, in which the longitudinal direction is an axis. As a result, the first reflection faces 2a are periodically repeatedly arranged and extend in parallel to each other, and the second reflection faces 2b are periodically repeatedly arranged and extend in parallel to each other. In the specific example shown in FIG. 14A, the first reflection faces 2a are extended along the direction (the Z direction) substantially perpendicular to the second reflection face 21b. The second reflection faces 2b extend clockwise in a direction of forming a predetermined angle (a relative angle) δ with respect to the corresponding first reflection faces 2a. The relative angle δ is, for example, 54.7° in a specific example.

Figure 14A:
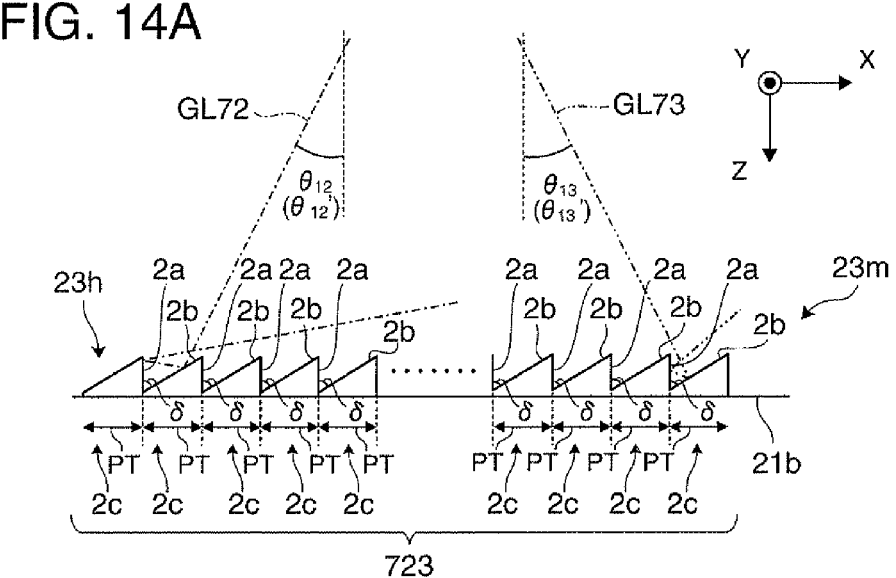
FIG. 14A to FIG. 14C are schematic diagrams illustrating a structure of an angle conversion unit and a light path of image light in the angle conversion unit.

In the specific example shown in FIG. 14A and the like, the first reflection face 2a is substantially perpendicular to the second reflection face 21b, but the direction of the first reflection face 2a may be appropriately adjusted according to specifications of the light guide device 720, and forms several inclination angles in the range of, for example, 80° to 100° anticlockwise in which the +X direction is reference with respect to the second reflection face 21b. The direction of the second reflection face 2b forms several inclination angles in the range of, for example, 30° to 40° anticlockwise in which the +X direction is reference with respect to the second reflection face 21b. As a result, the second reflection face 2b has several relative angles in the range of 40° to 70° with respect to the first reflection face 2a.

The reflection unit 2c including the pair of reflection faces 2a and 2b is formed by forming a film such as aluminum deposition or the like on one inclination face of, for example, a base V groove, and is embedded in the light guide device 720 by filling of resin thereafter.

Hereinafter, the bending of the light path of the image light by the angle conversion unit 723 will be described in detail. Herein, in the image light, the image light GL72 and image light GL73 input to both end sides of the angle conversion unit 723 are represented, and the other light paths are the same as that, and are not shown.

Figure 14B:
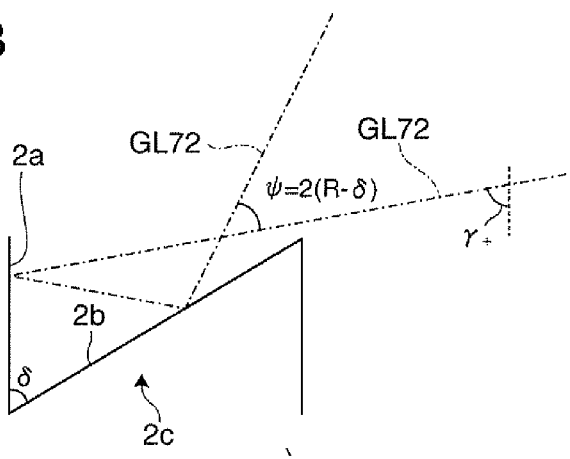

First, as shown in FIG. 14A and FIG. 14B, the image light GL72 directed at the maximum reflection angle $\gamma_+$ of the total reflection angle in the image light is input to one or more reflection units 2c disposed in the peripheral portion 23h on the −X side most far away from the light incident face IS (see FIG. 13A) in the angle conversion unit 723. In the reflection unit 2c, the image light GL72 is reflected by the first reflection face 2a on the back side, that is, the −X side for the first time, and then is reflected by the second reflection face 2b on the entrance side, that is, the +X side. The image light gL72 reflected by the reflection unit 2c is emitted from the light emission face OS shown in FIG. 13A and the like, without being reflected by the other reflection units 2c. That is, the image light GL72 is bent at a desired angle by one pass in the angle conversion unit 723, and is extracted to the viewer side.

As shown in FIG. 14A and FIG. 14O, the image light GL73 directed to the minimum reflection angle $\gamma_-$ of the total reflection angle is input to one or more reflection units 2c disposed in the peripheral portion 23m on the +X side closest to the light incident face IS (see FIG. 12A) of the angle conversion unit 723. In the reflection unit 2c, similarly to the case of the image light GL 72, the image light GL73 is reflected by the first reflection face 2a on the back side, that is, the −X side for the first time, and then is reflected by the second reflection face 2b on the entrance side, that is, the +X side. The image light GL73 reflected by the reflection unit 2c is bent at a desired angle by only one pass in the angle conversion unit 723 without being reflected by the other reflection units 2c, and is extracted to the viewer side.

Figure 14C:
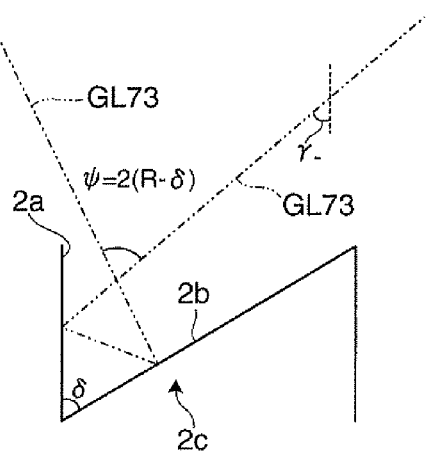

Herein, in the case of two-step reflection in the first and second reflection faces 2a and 2b described above, as shown in FIG. 14B and FIG. 14C, each bending angle ψ that is an angle formed by the incident direction and the emission direction of the image light is ω=2 (R−δ) (R: right angle). That is, the bending angle ψ is constant without depending on the incident angle with respect to the angle conversion unit 723, that is, values of the reflection angles $\gamma_0$, $\gamma_+$, and $\gamma_-$ that are the total reflection angles of the image light. Accordingly, as described above, even when a relatively large component of the total reflection angle of the image light is input to the peripheral portion 23h side on the −X side of the angle conversion unit 723 and a relatively small component of the total reflection angle is input to the peripheral portion 23m side on the +X side of the angle conversion unit 723, it is possible to efficiently extract the image light in an angle state where the image light is overall collected to the eye EY of the viewer. Since the image light is extracted in such an angle relationship, the light guide member 721 does not allow the image light to pass through the angle conversion unit 723 many times, and can allow the image light to pass only once, and thus it is possible to extract the image light as the virtual image light with little loss.

In the optical design such as the shape or the refractive index of the light guide member 721, and the shape of the reflection units 2c constituting the angle conversion unit 723, by appropriately adjusting the angle at which the image light GL72 and GL73 are directed, it is possible to input the image light emitted from the light emission face OS to the eye EY of the viewer as the virtual image light with overall symmetry being kept, on the basis of the basic image light GL71, that is, the optical axis AX. Herein, the angle $\theta_{12}$ ($\theta_{12}'$ in the light guide device 720) with respect to the X direction of the image light GL72 of one end or the optical axis AX, and the angle $\theta_{13}$ ($\theta_{13}'$ in the light guide device 720) with respect to the X direction of the image light GL73 of the other end or the optical axis AX have substantially the same size and are reverse directions. That is, the image light is emitted to the eye EY in a symmetric state centered on the optical axis AX. As described above, the angle $\theta_{12}$ and the angle $\theta_{13}$ are the same, and have the symmetry with respect to the optical axis AX, and thus the angle $\theta_{12}$ and the angle $\theta_{13}$ are a transverse half field angle that is a half value of the transverse field angle.

As described above, the first reflection face 2a or the second reflection face 2b constituting one group of reflection units 2c are parallel to each other at a constant pitch. Accordingly, the image light that is the virtual light input to the eye EY of the viewer is uniform, and it is possible to prevent the quality of the viewed image from being decreased. A specific numerical range of the pitch PT that is an interval of the reflection units 2c constituting the angle conversion unit 723 is equal to or more than 0.2 mm, and more preferably in the range of 0.2 mm to 1.3 mm. In this range, the image light to be extracted is not affected by diffraction in the angle conversion unit 723, and a lattice pattern based on the reflection unit 2c can be invisible to the viewer.

In the case of the light guide device 720 described above, as shown in FIG. 13A, the inclination face RS of the prism unit PS provided in the light guide member 721 is covered with the mirror layer 25 to form the third reflection face 21c. Herein, the mirror layer 25 covers the base face 121c, and protrudes or overhangs to the second reflection face 21b. That is, the mirror layer 25 is formed to protrude up to the first ridge line vicinity area on the second total reflection face 21b of the corner 21u in the angled portion 21r extending between the third reflection face 21c and the second total reflection face 21b, as well as the area of the third reflection face 21c. As a result, in the mirror layer 25, the main body layer 25a in the second ridge line vicinity area on the third reflection face 21c side in the angled poRtion 21r extending between the third reflection face 21c and the second total reflection face 21b has a sufficient thickness (specifically, a thickness equal to or more than 50 nm) as a mirror. Accordingly, the mirror layer 25 is in a state where sufficient thickness is secured, and it is possible to keep the reflectance of the image light high and to suppress the transmittance to be low, for example, it is possible to perform the non-transparent reflection equal to or less than 0.1%.

Fifth Embodiment

Hereinafter, a virtual image display device according to a fifth embodiment will be described. The virtual image display device according to the embodiment is a modification example of the virtual image display device 100 according to the fourth embodiment, and is the same as the virtual image display device 100 of the fourth embodiment when there is no particular description.

Figure 15A:
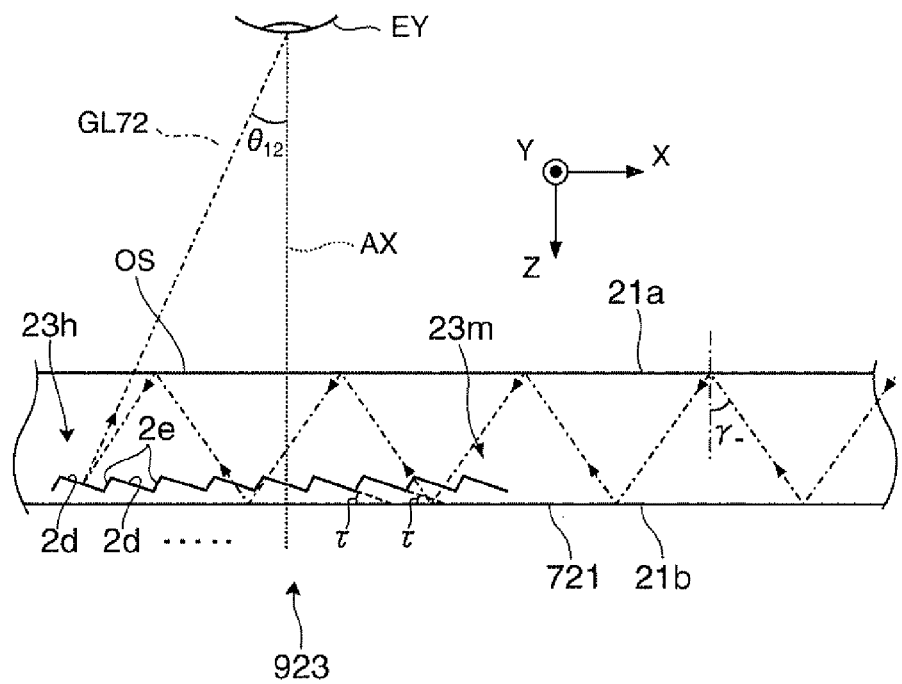
FIG. 15A and FIG. 15B are diagrams illustrating a part of a virtual image display device of a fifth embodiment.
Figure 15B:
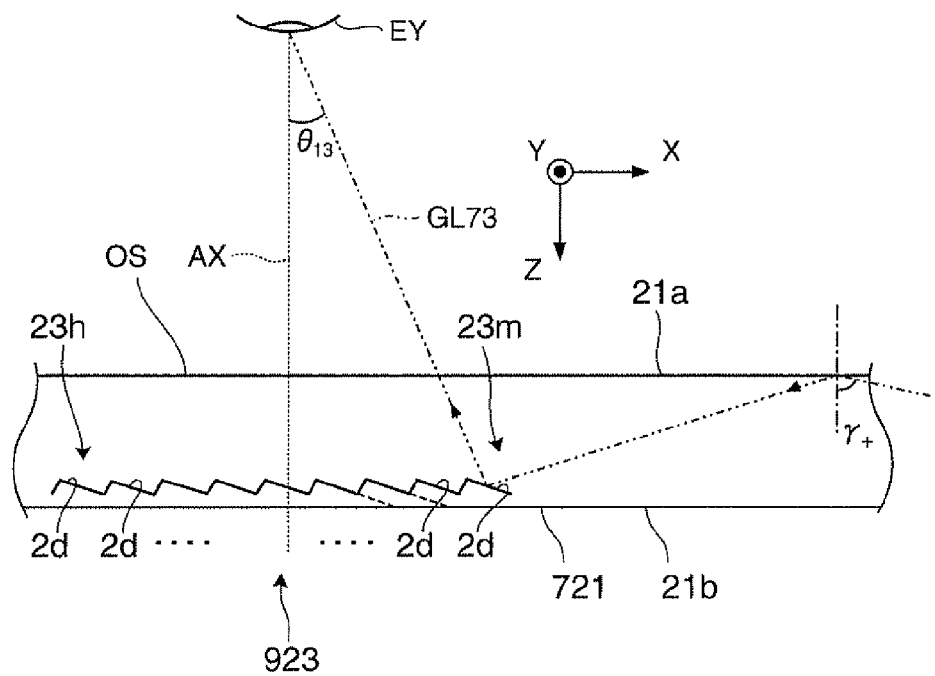

As shown in FIG. 15A and FIG. 15B, in the case of the embodiment, the angle conversion unit 923 of the light guide member 721 has a structure in which a plurality of image light reflection faces 2d are arranged at a predetermined pitch in the X direction. The image light reflection faces 2d extends in a stripe shape, in which a direction that is a main light guide direction and extends perpendicularly to the −X direction of arranging the image light reflection faces 2d, that is, the Y direction is the longitudinal direction. The image light reflection faces 2d are parallel to each other and form the same angle τ with respect to the second reflection face 21b. The image light reflection face 2d is a partial reflection face that allows a part of the optical component of the image light to pass, and reflects the other light. The adjacent image light reflection faces 2d may be connected by a boundary unit 2e which does not have a function as a reflection face or the like for extracting the image light. As a result, the image light reflection faces 2d are periodically repeatedly arranged along the main light guide direction, that is, along the Z direction, in a separated state, and extend in parallel to each other. The image light reflection faces 2d are formed by forming a film such as aluminum deposition on one inclination face of, for example, a basic V groove, and is embedded in the light guide member 721 by filling of resin thereafter.

As shown in FIG. 15A, the image light GL72 totally reflected by the first and second reflection faces 21a and 21b of the light guide member 721 at the minimum reflection angle $\gamma_-$ passes through the angle conversion unit 923 many times, reaches the peripheral portion 23h on the most back side (the −X side) of the angle conversion unit 923, and is emitted as parallel light flux from the light emission face OS to the eye EY at the angle $\theta_{12}$ with respect to the optical axis AX of the eye EY by the reflection at the peripheral portion 23h. Meanwhile, as shown in FIG. 15E, the image light GL73 totally reflected by the first and second reflection faces 21a and 21b of the light guide member 721 at the maximum reflection angle $\gamma_+$ reaches the peripheral portion 23m on the most entrance side (the +X side) of the angle conversion unit 923, and is emitted as parallel light flux from the light emission face OS toward the eye EY at the angle $\theta_n$ with respect to the optical axis AX of the eye EY by the reflection in the peripheral portion 23m.

Other

The invention has been described on the basis of the embodiment described above, but the invention is not limited to the embodiments described above, and may be variously modified within the scope which does not deviate from the main concept, for example, the following modification may be performed.

In the above description, the mirror layer 25 is formed by deposition, but the mirror layer 25 may be formed by plating, coating, spraying, dipping, roll coating, and wetting. The mirror layer 25 is not limited to aluminum, and may be formed of silver or the like.

In the above description, the transmission-type liquid crystal display device 32 or the like is used as the image light forming unit, but the image light forming unit is not limited to the transmission-type liquid crystal display device, and various devices may be used. For example, a configuration using a reflection-type liquid crystal display device may be employed, and a digital micro-mirror device or the like may be used instead of the liquid crystal display device 32.

In the above description, the light incident face IS and the light emission face OS are disposed on the same plane, but the invention is not limited thereto, for example, the light incident face IS may be disposed on the same plane as the first reflection face 21a, and the light emission face OS may be disposed on the same plane as the second reflection face 21b. In this case, the first reflection face 21a and the fourth reflection face 21d form an obtuse angle.

In the above description, the light guide member 21 extends in the transverse direction in which the eyes EY are arranged, but the light guide member 21 may extend in the longitudinal direction. In this case, the optical panel 110 shown in FIG. 1, that is, the light guide member 21 and 721 are not disposed in series but in parallel.

In the above description, the specific description in which the virtual image display device 100 is the head mount display is performed, but the virtual image display device 100 may be modified into a head up display.

In the virtual image display device 100 of the embodiment, the pair of display devices 100A and 100b (specifically, the image forming device 10, the light guide device 20, and the like) is provided corresponding to both of the right eye and the left eye, but the image forming device 10 and the light guide device 20 may be provided only in any one of the right eye and the left eye to view the image with one eye.

In the above description, the first optical axis AX1 passing through the light incident face IS and the second optical axis AX2 passing through the optical incident face IS are parallel to each other, but the optical axes AX1 and AX2 may not be parallel to each other.

In the above description, the display brightness of the liquid crystal display device 32 is not particularly adjusted, but the display brightness may be adjusted according to the range or superposition of the projection images IM1 and IM2 shown in FIG. 6B.

In the above description, the reflectance of the half mirror layer 28 provided in the fourth reflection face 21d of the light guide member 21 is 20%, in which the see-through has priority, but the reflectance of the half mirror layer 28 may be 50% or more, in which the image light has priority. It is not necessary to form the half mirror layer 28 only in the necessary area at a part of the fourth reflection face 21d, and it may be formed on the whole face of the fourth reflection face 21d. The half mirror layer 28 may be formed on the third face 23c of the light transmission member 23.

In the description of the fourth and fifth embodiments, the pitch PT of the arrangement of the reflection units 2c constituting the angle conversion unit 723 is not limited to the case of the same pitch between the first reflection faces 2a, and the invention includes a case where there is a difference in the pitches PT.

In the description of the fourth and fifth embodiments, the see-through type virtual image display device is described, but the angle conversion unit 723 and the like may be applied to a virtual image display device other than the see-through type. When it is not necessary to view the outside image, both of light reflectance of the first and second reflection faces 2a and 2b can be substantially 100%.

In the description of the fourth and fifth embodiments, the inclination angle of the mirror layer 25 constituting the prism unit PS or the inclination face RS is not particularly mentioned, but in the invention, the inclination angle of the mirror layer 25 or the like may be various values with respect to the optical axis AX according to the usage or the other specifications.

In the description of the fourth and fifth embodiments, the front end of the V-shaped groove based on the reflection unit 2c is shown in a sharp state, but the shape of the V-shaped groove is not limited thereto, and the front end may be cut to be flat, or the front end may be rounded.

The entire disclosure of Japanese Patent Application No. 2011-218976, filed Oct. 3, 2011 is expressly incorporated by reference herein.

What is claimed is:

1. A virtual image display device comprising:
    an image display device that forms image light;
    an optical projection system that forms a virtual image by the image light emitted from the image display device; and
    a light guide device that has a light incident unit receiving the image light passing through the optical projection system, a light guide unit directing the image light received from the light incident unit by total reflection on first and second faces opposed to each other and extending in parallel, and a light emission unit emitting the image light passing through the light guide unit to the outside,
    wherein the light incident unit has a third face that reflects the image light by a reflection unit forming an obtuse angle with respect to the second face, and
    wherein the reflection unit covers a ridge line vicinity area on a third face side in an angled portion between a third face and the second face, and the reflection unit protrudes and extends at least at a part of the ridge line vicinity area on the second face side in the angled portion.

2. The virtual image display device according to claim 1, wherein the reflection unit covering the ridge line vicinity area on the third face side has a predetermined thickness or more to perform non-transparent reflection.

3. The virtual image display device according to claim 2, wherein transmittance of the reflection unit is equal to or less than 1% in the ridge line vicinity area on the third face side or from the ridge line vicinity area on the third face side to a part corresponding to a protrusion width on the second face side.

4. The virtual image display device according to claim 2, wherein the light guide device integrally has the light incident unit, the light guide unit, and the light emission unit, as a block-shaped member, and
    wherein the light emission unit has a fourth face that is adjacent to any one of the first face and the second face and forms an obtuse angle with respect to any one of the first face and the second face.

5. The virtual image display device according to claim 1, wherein a protrusion width of the reflection unit in the ridge line vicinity area on the second face side in the angled portion is equal to or less than 0.1 mm.

6. The virtual image display device according to claim 1, wherein the reflection unit is formed of aluminum.

7. The virtual image display device according to claim 1, wherein the second face has a higher reflectance than the ridge line area on the third side face.

8. The virtual image display device according to claim 1, wherein the reflection unit is formed on an outside surface of the light guide device.

9. A method of manufacturing a virtual image display device including an image display device that forms image light, an optical projection system that forms a virtual image by the image light emitted from the image display device, and a light guide device that has a light incident unit receiving the image light passing through the optical projection system, a light guide unit directing the image light received from the light incident unit by total reflection on first and second faces opposed to each other and extending in parallel, and a light emission unit emitting the image light passing through the light guide unit to the outside,
    wherein the light incident unit forms an obtuse angle with respect to the second face, and has a third face that reflects the image light by an attendant reflection unit, and
    wherein the reflection unit is formed in the ridge line vicinity area on a third face side in an angled portion between a base face of a third face and the second face, and the reflection unit protrudes and extends at least at a part of the ridge line vicinity area on the second face side in the angled portion.

10. The virtual image display device according to claim 9, wherein the reflection unit covering the ridge line vicinity area on the third face side has a predetermined thickness or more to perform non-transparent reflection.

11. The method of manufacturing a virtual image display device according to claim 9, wherein in the forming of the reflection unit, the film is formed up to the ridge line vicinity area on the second face side in the angled portion extending between the second face and the third face.

12. The method of manufacturing a virtual image display device according to claim 11, wherein in the forming of the reflection unit, a mask that prevents a film material from being adhered to the outside of the ridge line vicinity area of the second face is disposed.

13. The method of manufacturing a virtual image display device according to claim 9, wherein the reflection unit is formed by forming an aluminum film.

14. The virtual image display device according to claim 9, wherein the second face has a higher reflectance than the ridge line area on the third side face.

15. The virtual image display device according to claim 9, wherein the reflection unit is formed on an outside surface of the light guide device.

\* \* \* \* \*